United States Patent
Cheng et al.

(10) Patent No.: US 10,264,563 B2
(45) Date of Patent: Apr. 16, 2019

(54) CONTROL INFORMATION TRANSMISSION METHOD, USER EQUIPMENT, AND BASE STATION

(71) Applicant: HUAWEI TECHNOLOGIES CO., LTD., Shenzhen (CN)

(72) Inventors: Yan Cheng, Beijing (CN); Lixia Xue, Beijing (CN); Brian Classon, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 14/996,599

(22) Filed: Jan. 15, 2016

(65) Prior Publication Data
US 2016/0135152 A1    May 12, 2016

Related U.S. Application Data

(63) Continuation of application No. PCT/CN2013/079458, filed on Jul. 16, 2013.

(51) Int. Cl.
*H04W 4/00* (2018.01)
*H04W 72/04* (2009.01)
(Continued)

(52) U.S. Cl.
CPC ......... *H04W 72/042* (2013.01); *H04L 5/0053* (2013.01); *H04L 5/0094* (2013.01); *H04L 41/0853* (2013.01); *H04W 4/06* (2013.01)

(58) Field of Classification Search
None
See application file for complete search history.

(56) References Cited

U.S. PATENT DOCUMENTS

| | | | | |
|---|---|---|---|---|
| 2013/0058240 A1* | 3/2013 | Kim | ...................... | H04L 5/0007 370/252 |
| 2013/0083739 A1* | 4/2013 | Yamada | .............. | H04W 74/006 370/329 |

(Continued)

FOREIGN PATENT DOCUMENTS

| | | |
|---|---|---|
| CN | 102378366 A | 3/2012 |
| CN | 102395206 A | 3/2012 |

(Continued)

OTHER PUBLICATIONS

Extended European Search Report dated May 13, 2016 in corresponding European Patent Application No. 13889364.9.

(Continued)

*Primary Examiner* — Zewdu A Beyen
(74) *Attorney, Agent, or Firm* — Staas & Halsey LLP

(57) ABSTRACT

A control information transmission method, user equipment, and a base station, and belong to the field of wireless technologies. The method includes: acquiring, by user equipment, configuration information of an enhanced physical downlink control channel EPDCCH set; determining, by the user equipment according to the configuration information and from the EPDCCH set, at least one EPDCCH set in which an EPDCCH needs to be monitored; and monitoring, by the user equipment, an EPDCCH on a resource corresponding to the at least one EPDCCH set, to acquire control information sent by a base station.

25 Claims, 6 Drawing Sheets

(51) Int. Cl.
*H04L 5/00* (2006.01)
*H04L 12/24* (2006.01)
*H04W 4/06* (2009.01)

(56) References Cited

U.S. PATENT DOCUMENTS

| | | |
|---|---|---|
| 2013/0114419 A1 | 5/2013 | Chen et al. |
| 2013/0114530 A1 | 5/2013 | Chen et al. |
| 2013/0155869 A1 | 6/2013 | Wu |
| 2014/0092821 A1* | 4/2014 | Zhu ................ H04W 52/0225 370/329 |
| 2014/0286297 A1 | 9/2014 | Zhao et al. |
| 2014/0334408 A1 | 11/2014 | Gao et al. |

FOREIGN PATENT DOCUMENTS

| | | |
|---|---|---|
| CN | 102891728 A | 1/2013 |
| CN | 103052160 A | 4/2013 |
| CN | 103096477 A | 5/2013 |
| CN | 103178932 A | 6/2013 |
| CN | 103200687 A | 7/2013 |
| EP | 2 779 557 A2 | 9/2014 |
| WO | 2011/085195 A1 | 7/2011 |
| WO | 2013/066084 A2 | 5/2013 |
| WO | 2013/067256 A1 | 5/2013 |
| WO | WO 2013171578 A1 * | 11/2013 ........... H04L 5/0053 |
| WO | 2014/049417 A2 | 4/2014 |

OTHER PUBLICATIONS

International Search Report dated Apr. 22, 2014 in corresponding International Patent Application No. PCT/CN2013/079458.
"Design Consideration for E-PDCCH", 3GPP TSG Ran WG1 Meeting #66 bis, Oct. 10-14, 2011, Zhuhai, China, R1-113236, pp. 1-6.
"EPDCCH Design Aspects", 3GPP TSG RAN WG1 Meeting #68bis, Mar. 26-30, 2012, Jeju, Korea, R1-121583, pp. 1-3.
"Design Principle for E-PDCCH Multiplexing", 3GPP TSG RAN WG1 Meeting #69, May 21-25, 2012, Prague, Czech Republic, R1-121976, pp. 1-3.
"Signalling Updates for EPDCCH", 3GPP TSG RAN WG4 Meeting #65, Nov. 12-16, 2012, New Orleans, USA, R4-126510, 2 pages.
Chinese Office Action dated Feb. 2, 2019 in Chinese Patent Application No. 201380002666.4 (10 pages).

* cited by examiner

CONTROL INFORMATION TRANSMISSION METHOD, USER EQUIPMENT, AND BASE STATION

CROSS-REFERENCE TO RELATED APPLICATIONS

This application is a continuation of International Application No. PCT/CN2013/079458, filed on Jul. 16, 2013, which is hereby incorporated by reference in its entirety.

TECHNICAL FIELD

Embodiments of the present invention relate to the field of wireless technologies, and in particular, to a control information transmission method, user equipment, and a base station.

BACKGROUND

In a long term evolution (LTE) system, in a release R (Release) 8/9/10/11, all LTE carriers are backward compatible, and each carrier sends a primary synchronization signal (PSS), a secondary synchronization signal (SSS), a physical broadcast channel (PBCH), a system information block (SIB), a physical downlink control channel (PDCCH), cell-specific reference signals (CRSs) of all frequency bands and all subframes, and the like that have a same resource location and a same sending manner as those in an LTE system of R8. In an LTE R8/9 release, demodulation of a physical downlink shared channel (PDSCH) is based on only a CRS. In an LTE R10 release, a DMRS (Demodulation Reference Signal, demodulation reference signal) is further introduced and is also used for PDSCH data demodulation, and the DMRS is sent only on a PRB (Physical Resource Block, physical resource block) that is used to transmit a PDSCH. Further, in an LTE R11 release, an enhanced physical downlink control channel (EPDCCH) is further introduced, the EPDCCH and a PDSCH are used by frequency division multiplexing, and a DMRS is also used to perform demodulation.

In an LTE R8/9/10/11 release, a maximum system bandwidth that can be supported by a carrier is 20 MHz, and an LTE terminal can receive and send data on an entire carrier. In a later LTE release, low-cost machine type communication (MTC) user equipment (UE) is introduced, and this type of user equipment can receive and send data only in a relatively low bandwidth (that is, a narrowband), so that a downlink data processing capability and data storage capability that are of an MTC terminal are lowered and costs are reduced.

In an LTE R12 release and a later release, an NCT (New Carrier Type, new carrier type) is introduced. On an NCT carrier, a single-antenna CRS is sent only in a small quantity of subframes, and the CRS is not used for PDSCH demodulation. In a release latter than an LTE R11 release, a new carrier type carrier is used to serve LTE terminals that have different capabilities, and serve multiple types of services such as unicast and an MBMS (Multimedia Broadcast Multicast Service, multimedia broadcast multicast service). One of design objectives for the new carrier type is highly efficient spectrum use, and therefore, how to design a transmission mechanism of a common control channel on an NCT carrier to obtain relatively high spectrum utilization is a problem that needs to be resolved.

SUMMARY

To reduce control signaling overheads and improve spectrum utilization, embodiments of the present invention provide a control information transmission method, user equipment, and a base station. The technical solutions are as follows:

According to a first aspect, a control information transmission method is provided, including:

acquiring, by user equipment, configuration information of an enhanced physical downlink control channel EPDCCH set;

determining, by the user equipment according to the configuration information and from the EPDCCH set, at least one EPDCCH set in which an EPDCCH needs to be monitored; and monitoring, by the user equipment, an EPDCCH on a resource corresponding to the at least one EPDCCH set, to acquire control information sent by a base station.

With reference to the first aspect, in a first possible implementation manner of the first aspect, the acquiring, by user equipment, configuration information of an enhanced physical downlink control channel EPDCCH set includes:

acquiring, by the user equipment, configuration information of at least two enhanced physical downlink control channel EPDCCH sets; and accordingly, the determining, by the user equipment according to the configuration information and from the EPDCCH set, at least one EPDCCH set in which an EPDCCH needs to be monitored includes:

determining, by the user equipment according to the configuration information of the at least two enhanced physical downlink control channel EPDCCH sets and from the at least two EPDCCH sets, the at least one EPDCCH set in which an EPDCCH needs to be monitored.

With reference to the first possible implementation manner of the first aspect, in a second possible implementation manner of the first aspect, the acquiring, by user equipment, configuration information of an EPDCCH set includes:

receiving, by the user equipment, a first EPDCCH on a first resource, and acquiring the configuration information of the at least two EPDCCH sets according to control information carried by the first EPDCCH; or receiving, by the user equipment, a broadcast channel, and acquiring the configuration information of the at least two EPDCCH sets according to a broadcast message carried by the broadcast channel.

With reference to the second possible implementation manner of the first aspect, in a third possible implementation manner of the first aspect, the receiving, by the user equipment, a first EPDCCH on a first resource, and acquiring the configuration information of the at least two EPDCCH sets according to control information carried by the first EPDCCH includes:

receiving, by the user equipment, the first EPDCCH on the first resource, decoding a physical downlink shared channel PDSCH according to the control information carried by the first EPDCCH, to acquire configuration information carried by the PDSCH, and acquiring the configuration information of the at least two EPDCCH sets according to the configuration information carried by the PDSCH; or receiving, by the user equipment, the first EPDCCH on the first resource, acquiring, according to the control information carried by the first EPDCCH, downlink control information DCI corresponding to the first EPDCCH, and acquiring the configuration information of the at least two EPDCCH sets according to configuration information carried in the DCI.

With reference to the first possible implementation manner of the first aspect, in a fourth possible implementation manner of the first aspect, the receiving, by the user equipment, a broadcast channel, and acquiring the configuration information of the at least two EPDCCH sets according to a broadcast message carried by the broadcast channel includes:

receiving, by the user equipment, a physical downlink broadcast channel or an enhanced physical downlink broadcast channel; and acquiring, by the user equipment, the configuration information of the at least two EPDCCH sets according to a broadcast message carried by the physical downlink broadcast channel or the enhanced physical downlink broadcast channel.

With reference to the first possible implementation manner of the first aspect, in a fifth possible implementation manner of the first aspect, the determining, by the user equipment according to the configuration information of the at least two enhanced physical downlink control channel EPDCCH sets and from the at least two EPDCCH sets, the at least one EPDCCH set in which an EPDCCH needs to be monitored includes:

acquiring, by the user equipment, transmission bandwidth configuration information;

acquiring a transmission bandwidth of the user equipment according to the transmission bandwidth configuration information; and determining, according to the transmission bandwidth of the user equipment and the configuration information of the at least two enhanced physical downlink control channel EPDCCH sets and from the at least two EPDCCH sets, the at least one EPDCCH set in which an EPDCCH needs to be monitored.

With reference to the fifth possible implementation manner of the first aspect, in a sixth possible implementation manner of the first aspect, the acquiring, by the user equipment, transmission bandwidth configuration information includes:

receiving, by the user equipment, a second EPDCCH on a first resource, and acquiring the transmission bandwidth configuration information according to control information carried by the second EPDCCH; or monitoring, by the user, a third EPDCCH on the resource corresponding to the current EPDCCH set in which an EPDCCH needs to be monitored, and acquiring the transmission bandwidth configuration information according to control information carried by the third EPDCCH.

With reference to the sixth possible implementation manner of the first aspect, in a seventh possible implementation manner of the first aspect, the second EPDCCH received by the user equipment on the first resource is an EPDCCH for which cyclic redundancy check CRC is scrambled by using a first RNTI, the first RNTI is shared by a group of user equipments, and transmission bandwidths corresponding to this group of user equipments are the same.

With reference to the fifth possible implementation manner of the first aspect, in an eighth possible implementation manner of the first aspect, the determining, according to the transmission bandwidth of the user equipment and the configuration information of the at least two enhanced physical downlink control channel EPDCCH sets and from the at least two EPDCCH sets, the at least one EPDCCH set in which an EPDCCH needs to be monitored includes:

determining, according to the transmission bandwidth of the user equipment and the configuration information of the at least two EPDCCH sets and from the at least two EPDCCH sets, that the EPDCCH set in which an EPDCCH needs to be monitored is at least one EPDCCH set whose corresponding physical resource block is located within the transmission bandwidth of the user equipment, or determining, according to the transmission bandwidth of the user equipment, a frequency hopping pattern of the transmission bandwidth, and the configuration information of the at least two enhanced physical downlink control channel EPDCCH sets and from the at least two EPDCCH sets, the at least one EPDCCH set in which an EPDCCH needs to be monitored.

With reference to the first possible implementation manner of the first aspect, in a ninth possible implementation manner of the first aspect, the determining, by the user equipment according to the configuration information of the at least two enhanced physical downlink control channel EPDCCH sets and from the at least two EPDCCH sets, the at least one EPDCCH set in which an EPDCCH needs to be monitored includes:

receiving, by the user equipment, a fourth EPDCCH on a first resource, and determining, based on control information carried by the received fourth EPDCCH and the configuration information of the at least two enhanced physical downlink control channel EPDCCH sets and from the at least two EPDCCH sets, the at least one EPDCCH set in which an EPDCCH needs to be monitored.

With reference to any possible implementation manner of the first aspect, in a tenth possible implementation manner of the first aspect, before the receiving, by the user equipment, a first EPDCCH on a first resource, the method further includes: receiving, by the user equipment, the broadcast channel, and acquiring a location of the first resource according to the broadcast message carried by the broadcast channel.

With reference to any possible implementation manner of the first aspect, in an eleventh possible implementation manner of the first aspect, the first resource is a first physical resource block set in a first subframe, the first subframe is a next subframe of a subframe in which a synchronization signal and/or a discovery signal are/is carried, and a frequency domain starting location of the first physical resource block set is the same as a frequency domain starting location of a physical resource block set on which a synchronization signal and/or a discovery signal are/is carried; or the first resource is a first physical resource block set in a first subframe, the first subframe is a next subframe of a subframe in which a synchronization signal and/or a discovery signal are/is carried, and there is a predetermined offset between a frequency domain starting location of the first physical resource block set and a frequency domain starting location of a physical resource block set on which a synchronization signal and/or a discovery signal are/is carried.

With reference to any possible implementation manner of the first aspect, in a twelfth possible implementation manner of the first aspect, a physical resource block pair corresponding to the first resource is the same as a physical resource block pair corresponding to one EPDCCH set of the at least two EPDCCH sets.

With reference to any possible implementation manner of the first aspect, in a thirteenth possible implementation manner of the first aspect, a transmission bandwidth corresponding to the first resource is less than or equal to a maximum transmission bandwidth supported by the user equipment, and the maximum transmission bandwidth supported by the user equipment is less than a downlink transmission bandwidth of a carrier.

With reference to any possible implementation manner of the first aspect, in a fourteenth possible implementation manner of the first aspect, if a maximum transmission bandwidth that can be supported by the user equipment is equal to a downlink transmission bandwidth of a carrier, the at least one EPDCCH set includes each EPDCCH set of the at least two EPDCCH sets, and a sum of maximum blind detection times corresponding to each EPDCCH set of the at least one EPDCCH set is equal to blind detection times corresponding to EPDCCH common search space, where the user equipment monitors an EPDCCH on a resource corresponding to each EPDCCH set of the at least one EPDCCH set; and if the maximum transmission bandwidth that can be supported by the user equipment is less than the downlink transmission bandwidth of the carrier, a quantity of EPDCCH sets included in the at least one EPDCCH set is less than a quantity of EPDCCH sets included in the at least two EPDCCH sets, and the sum of the maximum blind detection times corresponding to each EPDCCH set of the at least one EPDCCH set is equal to the blind detection times corresponding to the EPDCCH common search space, where the user equipment monitors the EPDCCH on the resource corresponding to each EPDCCH set of the at least one EPDCCH set.

With reference to any possible implementation manner of the first aspect, in a fifteenth possible implementation manner of the first aspect, the configuration information of the EPDCCH set is resource block allocation information of the EPDCCH set, and the acquiring, by user equipment, configuration information of an EPDCCH set includes:

receiving, by the user equipment, a broadcast channel, where a broadcast message carried by the broadcast channel includes first information that indicates resource allocation of the EPDCCH set, and the broadcast channel is a physical broadcast channel or an enhanced physical broadcast channel; and acquiring, by the user equipment, the first information that is in the broadcast message and that indicates resource allocation of the EPDCCH set, to obtain the resource block allocation information of the EPDCCH set.

With reference to the fifteenth possible implementation manner of the first aspect, in a sixteenth possible implementation manner of the first aspect, a quantity of information bits of the first information is corresponding to N preset physical resource block pairs, and a value of N is the same for all carriers with different downlink transmission bandwidths.

With reference to any possible implementation manner of the first aspect, in a seventeenth possible implementation manner of the first aspect, the determining, by the user equipment according to the configuration information and from the EPDCCH set, at least one EPDCCH set in which an EPDCCH needs to be monitored includes:

determining, by the user equipment according to the resource block allocation information of the EPDCCH set, a physical resource block pair corresponding to each EPDCCH set of the EPDCCH set; and determining, according to the resource block allocation information of the EPDCCH set, that each EPDCCH set of the EPDCCH set is the EPDCCH set in which an EPDCCH needs to be monitored by the user equipment; and the monitoring, by the user equipment, an EPDCCH on a resource corresponding to the at least one EPDCCH set, to acquire control information sent by a base station includes:

monitoring, by the user equipment, the EPDCCH on a physical resource block pair corresponding to the EPDCCH set in which an EPDCCH needs to be monitored, to acquire the control information sent by the base station.

With reference to any possible implementation manner of the first aspect, in an eighteenth possible implementation manner of the first aspect, the determining, by the user equipment according to the resource block allocation information of the EPDCCH set, a physical resource block pair corresponding to each EPDCCH set of the EPDCCH set includes:

determining, by the user equipment according to the resource block allocation information of the EPDCCH set and N preset physical resource blocks, a physical resource block pair that is of the N preset physical resource block pairs and is corresponding to each EPDCCH set of the EPDCCH set.

With reference to any possible implementation manner of the first aspect, in a nineteenth possible implementation manner of the first aspect, the acquiring, by user equipment, configuration information of an enhanced physical downlink control channel EPDCCH set is acquiring, by the user equipment, configuration information of an enhanced physical downlink control channel EPDCCH set corresponding to the enhanced physical downlink control channel EPDCCH common search space.

According to a second aspect, a control information transmission method is provided, including:

sending, by a base station, configuration information of an enhanced physical downlink control channel EPDCCH set to user equipment;

determining, by the base station from the EPDCCH set configured by using the configuration information, at least one EPDCCH set in which an EPDCCH needs to be monitored by the user equipment; and sending, by the base station, an EPDCCH on a resource corresponding to the at least one EPDCCH set, to notify the user equipment of control information.

With reference to the second aspect, in a first possible implementation manner of the second aspect, the sending, by a base station, configuration information of an EPDCCH set to user equipment is sending, by the base station, configuration information of at least two EPDCCH sets to the user equipment; and the EPDCCH set configured by using the configuration information is the at least two EPDCCH sets configured by using the configuration information.

With reference to the first possible implementation manner of the second aspect, in a second possible implementation manner of the second aspect, the sending, by the base station, configuration information of at least two EPDCCH sets to the user equipment includes:

sending, by the base station, a first EPDCCH to the user equipment on a first resource, so that the user equipment acquires the configuration information of the at least two EPDCCH sets according to control information carried by the first EPDCCH; or sending, by the base station, a broadcast channel to the user equipment, so that the user equipment acquires the configuration information of the at least two EPDCCH sets according to a broadcast message carried by the broadcast channel.

With reference to the second possible implementation manner of the second aspect, in a third possible implementation manner of the second aspect, the sending, by the base station, a first EPDCCH to the user equipment on a first resource, so that the user equipment acquires the configuration information of the at least two EPDCCH sets according to control information carried by the first EPDCCH is further:

sending, by the base station, the first EPDCCH to the user equipment on the first resource, and sending a physical downlink shared channel PDSCH on a resource indicated by the first EPDCCH, where the PDSCH carries the configuration information of the at least two EPDCCH sets, so that the user equipment decodes the PDSCH according to the first EPDCCH to acquire the configuration information of the at least two EPDCCH sets; or sending, by the base station, the first EPDCCH to the user equipment on the first resource, where the control information carried by the first EPDCCH includes the configuration information of the at least two EPDCCH sets, so that the user equipment acquires the configuration information of the at least two EPDCCH sets according to the control information carried by the first EPDCCH.

With reference to the second possible implementation manner of the second aspect, in a fourth possible implementation manner of the second aspect, the sending, by the base station, a broadcast channel to the user equipment includes:

sending, by the base station, a physical downlink broadcast channel or an enhanced physical downlink broadcast channel to the user equipment.

With reference to the first possible implementation manner of the second aspect, in a fifth possible implementation manner of the second aspect, the determining, by the base station from the at least two EPDCCH sets configured by using the configuration information, at least one EPDCCH set in which an EPDCCH needs to be monitored by the user equipment includes:

sending, by the base station, transmission bandwidth configuration information to the user equipment; and determining, by the base station according to a transmission bandwidth of the user equipment and from the at least two EPDCCH sets configured by using the configuration information, the at least one EPDCCH set in which an EPDCCH needs to be monitored by the user equipment.

With reference to the fifth possible implementation manner of the second aspect, in a sixth possible implementation manner of the second aspect, the sending, by the base station, transmission bandwidth configuration information to the user equipment includes:

sending, by the base station, a second EPDCCH to the user equipment on a first resource, so that the user equipment acquires the transmission bandwidth configuration information according to control information carried by the second EPDCCH; or sending, by the base station, a third EPDCCH on the resource corresponding to the current EPDCCH set in which an EPDCCH needs to be monitored by the user equipment, so that the user equipment acquires the transmission bandwidth configuration information according to control information carried by the third EPDCCH.

With reference to the fifth possible implementation manner of the second aspect, in a seventh possible implementation manner of the second aspect, the sending, by the base station, a second EPDCCH to the user equipment on a first resource includes: performing, by the base station, scrambling on cyclic redundancy check CRC for the second EPDCCH by using a first RNTI, and sending the second EPDCCH to the user equipment on the first resource, where the first RNTI is shared by a group of user equipments, and transmission bandwidths corresponding to this group of user equipments are the same.

With reference to the fifth possible implementation manner of the second aspect, in an eighth possible implementation manner of the second aspect, the determining, by the base station according to a transmission bandwidth of the user equipment and from the at least two EPDCCH sets configured by using the configuration information, the at least one EPDCCH set in which an EPDCCH needs to be monitored by the user equipment includes:

determining, by the base station according to the transmission bandwidth of the user equipment and from the at least two EPDCCH sets configured by using the configuration information, that the at least one EPDCCH set in which an EPDCCH needs to be monitored by the user equipment is at least one EPDCCH set that is of the at least two EPDCCH sets and whose corresponding physical resource block is located within the transmission bandwidth of the user equipment; or determining, according to the transmission bandwidth of the user equipment and a frequency hopping pattern of the transmission bandwidth and from the at least two EPDCCH sets configured by using the configuration information, the at least one EPDCCH set in which an EPDCCH needs to be monitored by the user equipment.

With reference to any possible implementation manner of the second aspect, in a ninth possible implementation manner of the second aspect, the method further includes:
sending, by the base station, the broadcast message to the user equipment, where the broadcast message carries location indication information of the first resource.

With reference to any possible implementation manner of the second aspect, in a tenth possible implementation manner of the second aspect, the first resource is a first physical resource block set in a first subframe, the first subframe is a next subframe of a subframe in which a synchronization signal and/or a discovery signal are/is carried, and a frequency domain starting location of the first physical resource block set is the same as a frequency domain starting location of a physical resource block set on which a synchronization signal and/or a discovery signal are/is carried; or the first resource is a first physical resource block set in a first subframe, the first subframe is a next subframe of a subframe in which a synchronization signal and/or a discovery signal are/is carried, and there is a predetermined offset between a frequency domain starting location of the first physical resource block set and a frequency domain starting location of a physical resource block set on which a synchronization signal and/or a discovery signal are/is carried.

With reference to any possible implementation manner of the second aspect, in an eleventh possible implementation manner of the second aspect, a physical resource block pair corresponding to the first resource is the same as a physical resource block pair corresponding to one EPDCCH set of the at least two EPDCCH sets.

With reference to any possible implementation manner of the second aspect, in a twelfth possible implementation manner of the second aspect, a transmission bandwidth corresponding to the first resource is less than or equal to a maximum transmission bandwidth supported by the user equipment, and the maximum transmission bandwidth supported by the user equipment is less than a downlink transmission bandwidth of a carrier.

With reference to any possible implementation manner of the second aspect, in a thirteenth possible implementation manner of the second aspect, the sending, by a base station, configuration information of an EPDCCH set to user equipment is sending, by the base station, resource block allocation information of the EPDCCH set to the user equipment, and includes:

sending, by the base station, a broadcast channel, where a broadcast message carried by the broadcast channel includes first information that indicates resource allocation of the EPDCCH set, and the base station sends the resource block allocation information of the EPDCCH set by sending the broadcast channel, where the broadcast channel is a physical broadcast channel or an enhanced physical broadcast channel.

With reference to the thirteenth possible implementation manner of the second aspect, in a fourteenth possible implementation manner of the second aspect, a quantity of information bits of the first information is corresponding to N preset physical resource block pairs, and a value of N is the same for all carriers with different downlink transmission bandwidths.

With reference to any possible implementation manner of the second aspect, in a fifteenth possible implementation manner of the second aspect, the sending, by a base station, configuration information of an enhanced physical downlink control channel EPDCCH set to user equipment is sending, by the base station to the user equipment, configuration information of an enhanced physical downlink control channel EPDCCH set corresponding to enhanced physical downlink control channel EPDCCH common search space.

According to a third aspect, user equipment includes:

an acquiring module, configured to acquire configuration information of an enhanced physical downlink control channel EPDCCH set;

a determining module, configured to determine, according to the configuration information and from the EPDCCH set, at least one EPDCCH set in which an EPDCCH needs to be monitored by the user equipment; and a monitoring module, configured to monitor an EPDCCH on a resource corresponding to the at least one EPDCCH set, to acquire control information sent by a base station.

With reference to the third aspect, in a first possible implementation manner of the third aspect, the acquiring module is configured to acquire configuration information of at least two enhanced physical downlink control channel EPDCCH sets; and the determining module is configured to determine, according to the configuration information of the at least two enhanced physical downlink control channel EPDCCH sets and from the at least two EPDCCH sets, the at least one EPDCCH set in which an EPDCCH needs to be monitored.

With reference to the first possible implementation manner of the third aspect, in a second possible implementation manner of the third aspect, the acquiring module is configured to: receive a first EPDCCH on a first resource, and acquire the configuration information of the at least two EPDCCH sets according to control information carried by the first EPDCCH; or the acquiring module is configured to: receive a broadcast channel, and acquire the configuration information of the at least two EPDCCH sets according to a broadcast message carried by the broadcast channel.

With reference to the second possible implementation manner of the third aspect, in a third possible implementation manner of the third aspect, the acquiring module is configured to: receive the first EPDCCH on the first resource; decode a physical downlink shared channel PDSCH according to the control information carried by the first EPDCCH, to acquire configuration information carried by the PDSCH; and acquire the configuration information of the at least two EPDCCH sets according to the configuration information carried by the PDSCH; or the acquiring module is configured to: receive the first EPDCCH on the first resource, acquire, according to the control information carried by the first EPDCCH, downlink control information DCI corresponding to the first EPDCCH, and acquire the configuration information of the at least two EPDCCH sets according to configuration information carried in the DCI.

With reference to the first possible implementation manner of the third aspect, in a fourth possible implementation manner of the third aspect, the acquiring module is configured to: receive a physical downlink broadcast channel or an enhanced physical downlink broadcast channel, and acquire the configuration information of the at least two EPDCCH sets according to a broadcast message carried by the physical downlink broadcast channel or the enhanced physical downlink broadcast channel.

With reference to the first possible implementation manner of the third aspect, in a fifth possible implementation manner of the third aspect, the determining module includes:

a bandwidth configuration information acquiring unit, configured to acquire transmission bandwidth configuration information;

a transmission bandwidth acquiring unit, configured to acquire a transmission bandwidth of the user equipment according to the transmission bandwidth configuration information; and a determining unit, configured to determine, according to the transmission bandwidth of the user equipment and the configuration information of the at least two enhanced physical downlink control channel EPDCCH sets and from the at least two EPDCCH sets, the at least one EPDCCH set in which an EPDCCH needs to be monitored.

With reference to the fifth possible implementation manner of the third aspect, in a sixth possible implementation manner of the third aspect, the bandwidth configuration information acquiring unit is configured to: receive a second EPDCCH on a first resource, and acquire the transmission bandwidth configuration information according to control information carried by the second EPDCCH; or the bandwidth configuration information acquiring unit is configured to: monitor a third EPDCCH on the resource corresponding to the current EPDCCH set in which an EPDCCH needs to be monitored, and acquire the transmission bandwidth configuration information according to control information carried by the third EPDCCH.

With reference to the sixth possible implementation manner of the third aspect, in a seventh possible implementation manner of the third aspect, the second EPDCCH received on the first resource is an EPDCCH for which cyclic redundancy check CRC is scrambled by using a first RNTI, the first RNTI is shared by a group of user equipments, and transmission bandwidths corresponding to this group of user equipments are the same.

With reference to the fifth possible implementation manner of the third aspect, in an eighth possible implementation manner of the third aspect, the determining unit is configured to determine, according to the transmission bandwidth of the user equipment and the configuration information of the at least two EPDCCH sets and from the at least two EPDCCH sets, that the EPDCCH set in which an EPDCCH needs to be monitored is at least one EPDCCH set whose corresponding physical resource block is located within the transmission bandwidth of the user equipment, or the determining unit is configured to determine, according to the transmission bandwidth of the user equipment, a frequency hopping pattern of the transmission bandwidth, and the configuration information of the at least two enhanced physical downlink control channel EPDCCH sets and from the at least two EPDCCH sets, the at least one EPDCCH set in which an EPDCCH needs to be monitored.

With reference to the first possible implementation manner of the third aspect, in a ninth possible implementation manner of the third aspect, the determining module is configured to: receive a fourth EPDCCH on a first resource, and determine, based on control information carried by the received fourth EPDCCH and the configuration information of the at least two enhanced physical downlink control channel EPDCCH sets and from the at least two EPDCCH sets, the at least one EPDCCH set in which an EPDCCH needs to be monitored.

With reference to any possible implementation manner of the third aspect, in a tenth possible implementation manner of the third aspect, the user equipment further includes: a broadcast channel receiving module, configured to: receive the broadcast channel, and acquire a location of the first resource according to the broadcast message carried by the broadcast channel.

With reference to any possible implementation manner of the third aspect, in an eleventh possible implementation manner of the third aspect, the first resource is a first physical resource block set in a first subframe, the first subframe is a next subframe of a subframe in which a synchronization signal and/or a discovery signal are/is carried, and a frequency domain starting location of the first physical resource block set is the same as a frequency domain starting location of a physical resource block set on which a synchronization signal and/or a discovery signal are/is carried; or the first resource is a first physical resource block set in a first subframe, the first subframe is a next subframe of a subframe in which a synchronization signal and/or a discovery signal are/is carried, and there is a predetermined offset between a frequency domain starting location of the first physical resource block set and a frequency domain starting location of a physical resource block set on which a synchronization signal and/or a discovery signal are/is carried.

With reference to any possible implementation manner of the third aspect, in a twelfth possible implementation manner of the third aspect, a physical resource block pair corresponding to the first resource is the same as a physical resource block pair corresponding to one EPDCCH set of the at least two EPDCCH sets.

With reference to any possible implementation manner of the third aspect, in a thirteenth possible implementation manner of the third aspect, a transmission bandwidth corresponding to the first resource is less than or equal to a maximum transmission bandwidth supported by the user equipment, and the maximum transmission bandwidth supported by the user equipment is less than a downlink transmission bandwidth of a carrier.

With reference to any possible implementation manner of the third aspect, in a fourteenth possible implementation manner of the third aspect, the monitoring module is configured to: if a maximum transmission bandwidth that can be supported by the user equipment is equal to a downlink transmission bandwidth of a carrier, the at least one EPDCCH set includes each EPDCCH set of the at least two EPDCCH sets, and a sum of maximum blind detection times corresponding to each EPDCCH set of the at least one EPDCCH set is equal to blind detection times corresponding to EPDCCH common search space, where the user equipment monitors an EPDCCH on a resource corresponding to each EPDCCH set of the at least one EPDCCH set; and the monitoring module is configured to: if the maximum transmission bandwidth that can be supported by the user equipment is less than the downlink transmission bandwidth of the carrier, a quantity of EPDCCH sets included in the at least one EPDCCH set is less than a quantity of EPDCCH sets included in the at least two EPDCCH sets, and the sum of the maximum blind detection times corresponding to each EPDCCH set of the at least one EPDCCH set is equal to the blind detection times corresponding to the EPDCCH common search space, where the user equipment monitors the EPDCCH on the resource corresponding to each EPDCCH set of the at least one EPDCCH set.

With reference to any possible implementation manner of the third aspect, in a fifteenth possible implementation manner of the third aspect, the configuration information of the EPDCCH set is resource block allocation information of the EPDCCH set, and the acquiring module includes:

a receiving unit, configured to receive a broadcast channel, where a broadcast message carried by the broadcast channel includes first information that indicates resource allocation of the EPDCCH set, and the broadcast channel is a physical broadcast channel or an enhanced physical broadcast channel; and a first-information acquiring unit, configured to acquire the first information that is in the broadcast message and that indicates resource allocation of the EPDCCH set, to obtain the resource block allocation information of the EPDCCH set.

With reference to the fifteenth possible implementation manner of the third aspect, in a sixteenth possible implementation manner of the third aspect, a quantity of information bits of the first information is corresponding to N preset physical resource block pairs, and a value of N is the same for all carriers with different downlink transmission bandwidths.

With reference to any possible implementation manner of the third aspect, in a seventeenth possible implementation manner of the third aspect, the determining module is configured to: determine, according to the resource block allocation information of the EPDCCH set, a physical resource block pair corresponding to each EPDCCH set of the EPDCCH set; and determine, according to the resource block allocation information of the EPDCCH set, that each EPDCCH set of the EPDCCH set is the EPDCCH set in which an EPDCCH needs to be monitored by the user equipment; and accordingly, the monitoring module is configured to monitor the EPDCCH on a physical resource block pair corresponding to the EPDCCH set in which an EPDCCH needs to be monitored, to acquire the control information sent by the base station.

With reference to any possible implementation manner of the third aspect, in an eighteenth possible implementation manner of the third aspect, the determining module is configured to determine, according to the resource block allocation information of the EPDCCH set and N preset physical resource blocks, a physical resource block pair that is of the N preset physical resource block pairs and is corresponding to each EPDCCH set of the EPDCCH set.

With reference to any possible implementation manner of the third aspect, in a nineteenth possible implementation manner of the third aspect, that the user equipment acquires the configuration information of the enhanced physical downlink control channel EPDCCH set is that the user equipment acquires configuration information of an enhanced physical downlink control channel EPDCCH set corresponding to the enhanced physical downlink control channel EPDCCH common search space.

According to a fourth aspect, a base station includes:

a sending module, configured to send configuration information of an enhanced physical downlink control channel EPDCCH set to user equipment;

a determining module, configured to determine, from the EPDCCH set configured by using the configuration information, at least one EPDCCH set in which an EPDCCH needs to be monitored by the user equipment; and an EPDCCH sending module, configured to send an EPDCCH on a resource corresponding to the at least one EPDCCH set, to notify the user equipment of control information.

With reference to the fourth aspect, in a first possible implementation manner of the fourth aspect, the sending configuration information of an EPDCCH set to the user equipment is sending, by the base station, configuration information of at least two EPDCCH sets to the user equipment; and the EPDCCH set configured by using the configuration information is the at least two EPDCCH sets configured by using the configuration information.

With reference to the first possible implementation manner of the fourth aspect, in a second possible implementation manner of the fourth aspect, the sending module is configured to send a first EPDCCH to the user equipment on a first resource, so that the user equipment acquires the configuration information of the at least two EPDCCH sets according to control information carried by the first EPDCCH; or the sending module is configured to send a broadcast channel to the user equipment, so that the user equipment acquires the configuration information of the at least two EPDCCH sets according to a broadcast message carried by the broadcast channel.

With reference to the second possible implementation manner of the fourth aspect, in a third possible implementation manner of the fourth aspect, the sending module is configured to: send the first EPDCCH to the user equipment on the first resource, and send a physical downlink shared channel PDSCH on a resource indicated by the first EPDCCH, where the PDSCH carries the configuration information of the at least two EPDCCH sets, so that the user equipment decodes the PDSCH according to the first EPDCCH to acquire the configuration information of the at least two EPDCCH sets; or the sending module is configured to send the first EPDCCH to the user equipment on the first resource, where the control information carried by the first EPDCCH includes the configuration information of the at least two EPDCCH sets, so that the user equipment acquires the configuration information of the at least two EPDCCH sets according to the control information carried by the first EPDCCH.

With reference to the second possible implementation manner of the fourth aspect, in a fourth possible implementation manner of the fourth aspect, the sending module is configured to send a physical downlink broadcast channel or an enhanced physical downlink broadcast channel to the user equipment.

With reference to the first possible implementation manner of the fourth aspect, in a fifth possible implementation manner of the fourth aspect, the sending module is configured to send transmission bandwidth configuration information to the user equipment; and the determining module is configured to determine, according to a transmission bandwidth of the user equipment and from the at least two EPDCCH sets configured by using the configuration information, the at least one EPDCCH set in which an EPDCCH needs to be monitored by the user equipment.

With reference to the fifth possible implementation manner of the fourth aspect, in a sixth possible implementation manner of the fourth aspect, the sending module is configured to send a second EPDCCH to the user equipment on a first resource, so that the user equipment acquires the transmission bandwidth configuration information according to control information carried by the second EPDCCH; or the sending module is configured to send a third EPDCCH on the resource corresponding to the current EPDCCH set in which an EPDCCH needs to be monitored by the user equipment, so that the user equipment acquires the transmission bandwidth configuration information according to control information carried by the third EPDCCH.

With reference to the fifth possible implementation manner of the fourth aspect, in a seventh possible implementation manner of the fourth aspect, the sending module is configured to: perform scrambling on cyclic redundancy check CRC for the second EPDCCH by using a first RNTI, and send the second EPDCCH to the user equipment on the first resource, where the first RNTI is shared by a group of user equipments, and transmission bandwidths corresponding to this group of user equipments are the same.

With reference to the fifth possible implementation manner of the fourth aspect, in an eighth possible implementation manner of the fourth aspect, the determining module is configured to determine, according to the transmission bandwidth of the user equipment and from the at least two EPDCCH sets configured by using the configuration information, that the at least one EPDCCH set in which an EPDCCH needs to be monitored by the user equipment is at least one EPDCCH set that is of the at least two EPDCCH sets and whose corresponding physical resource block is located within the transmission bandwidth of the user equipment; or the determining module is configured to determine, according to the transmission bandwidth of the user equipment and a frequency hopping pattern of the transmission bandwidth and from the at least two EPDCCH sets configured by using the configuration information, the at least one EPDCCH set in which an EPDCCH needs to be monitored by the user equipment.

With reference to any possible implementation manner of the fourth aspect, in a ninth possible implementation manner of the fourth aspect, the sending module is further configured to send the broadcast message to the user equipment, where the broadcast message carries location indication information of the first resource.

With reference to any possible implementation manner of the fourth aspect, in a tenth possible implementation manner of the fourth aspect, the first resource is a first physical resource block set in a first subframe, the first subframe is a next subframe of a subframe in which a synchronization signal and/or a discovery signal are/is carried, and a frequency domain starting location of the first physical resource block set is the same as a frequency domain starting location of a physical resource block set on which a synchronization signal and/or a discovery signal are/is carried; or the first resource is a first physical resource block set in a first subframe, the first subframe is a next subframe of a subframe in which a synchronization signal and/or a discovery signal are/is carried, and there is a predetermined offset between a frequency domain starting location of the first physical resource block set and a frequency domain starting location of a physical resource block set on which a synchronization signal and/or a discovery signal are/is carried.

With reference to any possible implementation manner of the fourth aspect, in an eleventh possible implementation manner of the fourth aspect, a physical resource block pair corresponding to the first resource is the same as a physical resource block pair corresponding to one EPDCCH set of the at least two EPDCCH sets.

With reference to any possible implementation manner of the fourth aspect, in a twelfth possible implementation manner of the fourth aspect, a transmission bandwidth corresponding to the first resource is less than or equal to a maximum transmission bandwidth supported by the user equipment, and the maximum transmission bandwidth supported by the user equipment is less than a downlink transmission bandwidth of a carrier.

With reference to any possible implementation manner of the fourth aspect, in a thirteenth possible implementation manner of the fourth aspect, the sending module is configured to send a broadcast channel, where a broadcast message carried by the broadcast channel includes first information that indicates resource allocation of the EPDCCH set, and resource block allocation information of the EPDCCH set is sent by sending the broadcast channel, where the broadcast channel is a physical broadcast channel or an enhanced physical broadcast channel.

With reference to the thirteenth possible implementation manner of the fourth aspect, in a fourteenth possible implementation manner of the fourth aspect, a quantity of information bits of the first information is corresponding to N preset physical resource block pairs, and a value of N is the same for all carriers with different downlink transmission bandwidths.

With reference to any possible implementation manner of the fourth aspect, in a fifteenth possible implementation manner of the fourth aspect, the sending, configuration information of an enhanced physical downlink control channel EPDCCH set to user equipment is sending, by the base station to the user equipment, configuration information of an enhanced physical downlink control channel EPDCCH set corresponding to enhanced physical downlink control channel EPDCCH common search space.

Beneficial effects of the technical solutions provided in the embodiments of the present invention are as follows:

User equipment acquires configuration information of an enhanced physical downlink control channel EPDCCH set; the user equipment determines, according to the configuration information and from the EPDCCH set, at least one EPDCCH set in which an EPDCCH needs to be monitored; and the user equipment monitors an EPDCCH on a resource corresponding to the at least one EPDCCH set, to acquire control information sent by a base station. Because the at least one EPDCCH set is only a part of EPDCCH sets corresponding to EPDCCH common search space, and this part of EPDCCHs is selectively monitored to acquire the control information, repetitious sending of common control information can be avoided, control signaling overheads can be reduced, and spectrum utilization can be improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
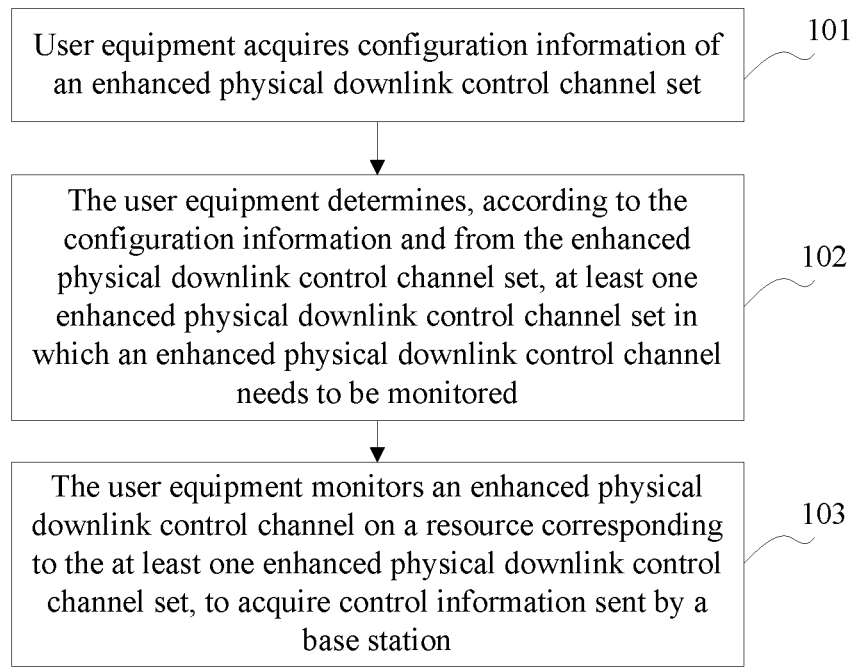
FIG. 1 is a flowchart of a control information transmission method according to an embodiment of the present invention.

FIG. 1 is a flowchart of a control information transmission method according to an embodiment of the present invention. Referring to FIG. 1, this embodiment of the present invention specifically includes the following steps:

101. User equipment acquires configuration information of an enhanced physical downlink control channel EPDCCH set.

In step 101, the EPDCCH set configured by using the configuration information is an EPDCCH set corresponding to EPDCCH common search space, and the configuration information may be used to configure one or more EPDCCH sets. When there are multiple EPDCCH sets configured by using the configuration information, different user equipments may determine, according to capabilities of the user equipments and from the configured multiple EPDCCH sets, at least one EPDCCH set in which an EPDCCH needs to be monitored.

Configuration information that is corresponding to each EPDCCH set and is in the configuration information may include information such as a quantity of physical resource block pairs corresponding to the EPDCCH set, a physical resource block pair corresponding to the EPDCCH set, and an identifier of the EPDCCH set. The user equipment may determine, according to the configuration information, information such as a quantity of physical resource block pairs corresponding to each EPDCCH set, a physical resource block of each EPDCCH set, and an identifier of the EPDCCH set.

102. The user equipment determines, according to the configuration information and from the EPDCCH set, at least one EPDCCH set in which an EPDCCH needs to be monitored.

103. The user equipment monitors an EPDCCH on a resource corresponding to the at least one EPDCCH set, to acquire control information sent by a base station.

The resource corresponding to the at least one EPDCCH set may be a physical resource block pair corresponding to the at least one EPDCCH set.

The monitoring may be performed based on a relationship between a maximum transmission bandwidth supported by the user equipment and a downlink transmission bandwidth of a carrier, where blind detection times corresponding to each EPDCCH set of the at least one EPDCCH set is determined according to the relationship between the maximum transmission bandwidth supported by the user equipment and the downlink transmission bandwidth of the carrier, and an EPDCCH is monitored, according to the determined blind detection times, on a resource corresponding to each EPDCCH set of the at least one EPDCCH set.

According to the method provided in this embodiment of the present invention, because at least one EPDCCH set is only a part of EPDCCH sets corresponding to EPDCCH common search space, and this part may be monitored by users that have different capabilities in a system, common control information that needs to be detected by all the users may be sent on this part of the EPDCCH sets; therefore, repetitious sending of the common control information can be avoided, control signaling overheads can be reduced, and spectrum utilization can be improved.

Optionally, based on the embodiment shown in FIG. 1, step 101 "user equipment acquires configuration information of an enhanced physical downlink control channel EPDCCH set" includes: the user equipment acquires configuration information of at least two enhanced physical downlink control channel EPDCCH sets.

Accordingly, step 102 "the user equipment determines, according to the configuration information and from the EPDCCH set, at least one EPDCCH set in which an EPDCCH needs to be monitored" includes: the user equipment determines, according to the configuration information of the at least two enhanced physical downlink control channel EPDCCH sets and from the at least two EPDCCH sets, the at least one EPDCCH set in which an EPDCCH needs to be monitored.

Optionally, based on the embodiment shown in FIG. 1, step 101 "user equipment acquires configuration information of an EPDCCH set" includes the following step 1011:

1011. The user equipment receives a first EPDCCH on a first resource, and acquires the configuration information of the at least two EPDCCH sets according to control information carried by the first EPDCCH.

The control information carried by the first EPDCCH may include SIB information, and the like. For different configurations by the base station, the first EPDCCH may carry different information in different domains.

Optionally, based on the embodiment shown in FIG. 1, step 101 "user equipment acquires configuration information of an EPDCCH set" includes the following step 1012:

1012. The user equipment receives a broadcast channel, and acquires the configuration information of the at least two EPDCCH sets according to a broadcast message carried by the broadcast channel.

The broadcast message includes the configuration information of the at least two EPDCCH sets, that is, the configuration information of the at least two EPDCCH sets is a part of the broadcast message.

Further, optionally, based on the technical solution of the embodiment shown in FIG. 1, the foregoing step 1011 "the user equipment receives a first EPDCCH on a first resource, and acquires the configuration information of the at least two EPDCCH sets according to control information carried by the first EPDCCH" includes the following step 1011a:

1011a. The user equipment decodes a physical downlink shared channel PDSCH according to the control information carried by the first EPDCCH, to acquire configuration information carried by the PDSCH, and acquires the configuration information of the at least two EPDCCH sets according to the configuration information carried by the PDSCH.

Preferably, in step 1011a, the configuration information carried by the PDSCH may be SIB information.

Further, optionally, based on the technical solution of the embodiment shown in FIG. 1, the foregoing step 1011 the user equipment receives a first EPDCCH on a first resource, and acquires the configuration information of the at least two EPDCCH sets according to control information carried by the first EPDCCH" includes the following step 1011b:

1011b. The user equipment receives the first EPDCCH on the first resource, acquires, according to the control information carried by the first EPDCCH, downlink control information DCI corresponding to the first EPDCCH, and acquires the configuration information of the at least two EPDCCH sets according to configuration information carried in the DCI.

Preferably, in step 1011b, the configuration information of the at least two EPDCCH sets is carried in the downlink control information DCI corresponding to the received first EPDCCH.

Further, optionally, based on the technical solution of the embodiment shown in FIG. 1, the foregoing step 1012 "the user equipment receives a broadcast channel, and acquires the configuration information of the at least two EPDCCH sets according to a broadcast message carried by the broadcast channel" includes the following steps 1012a and 1012b:

1012a. The user equipment receives a physical downlink broadcast channel or an enhanced physical downlink broadcast channel.

1012b. The user equipment acquires the configuration information of the at least two EPDCCH sets according to a broadcast message carried by the physical downlink broadcast channel or the enhanced physical downlink broadcast channel.

Further, optionally, based on the technical solution of the embodiment shown in FIG. 1, the foregoing step 102 "the user equipment determines, according to the configuration information of the at least two enhanced physical downlink control channel EPDCCH sets and from the at least two EPDCCH sets, the at least one EPDCCH set in which an EPDCCH needs to be monitored" includes the following steps 1021 to 1023:

1021. The user equipment acquires transmission bandwidth configuration information.

The transmission bandwidth configuration information is used to indicate a transmission bandwidth of the user equipment.

1022. Acquire a transmission bandwidth of the user equipment according to the transmission bandwidth configuration information.

1023. The user equipment determines, according to the transmission bandwidth of the user equipment and the configuration information of the at least two enhanced physical downlink control channel EPDCCH sets and from the at least two EPDCCH sets, the at least one EPDCCH set in which an EPDCCH needs to be monitored.

The user equipment determines, according to the configuration information of the at least two enhanced physical downlink control channel EPDCCH sets, a physical resource block pair corresponding to each EPDCCH set, then determines, according to the transmission bandwidth of the user equipment, at least one EPDCCH set that is of the at least two EPDCCH sets and whose corresponding physical resource block is located within the transmission bandwidth of the user equipment, and uses the determined at least one EPDCCH set as the EPDCCH set in which an EPDCCH needs to be monitored by the user equipment.

Further, optionally, based on the technical solution of the embodiment shown in FIG. 1, the foregoing step 1021 "the user equipment acquires transmission bandwidth configuration information" includes the following step 1021*a*:

1021*a*. The user equipment receives a second EPDCCH on a first resource, and acquires the transmission bandwidth configuration information according to control information carried by the second EPDCCH.

Specifically, step 1021*a* may further include either of the following cases: (1) The user equipment receives the second EPDCCH on the first resource, and the user equipment decodes a physical downlink shared channel PDSCH according to the control information carried by the second EPDCCH, to acquire configuration information carried by the PDSCH, and acquires the transmission bandwidth configuration information according to the configuration information carried by the PDSCH, where the information carried by the PDSCH may be SIB information, but the SIB information is received by only user equipment whose supported maximum transmission bandwidth is less than the downlink transmission bandwidth of the carrier. (2) The user equipment receives the second EPDCCH on the first resource, and the user equipment acquires, according to the control information carried by the second EPDCCH, downlink control information corresponding to the second EPDCCH, and acquires the transmission bandwidth configuration information according to configuration information carried in the downlink control information.

Step 1021*a* is similar to step 1011, and details are not described herein again.

Further, optionally, based on the technical solution of the embodiment shown in FIG. 1, the foregoing step 1021 "the user equipment acquires transmission bandwidth configuration information" includes the following step 1021*b*:

1021*b*. The user equipment monitors a third EPDCCH on the resource corresponding to the current EPDCCH set in which an EPDCCH needs to be monitored, and acquires the transmission bandwidth configuration information according to control information carried by the third EPDCCH.

For the user equipment, the EPDCCH set in which an EPDCCH needs to be monitored may be currently determined, and then the transmission bandwidth configuration information may be acquired according to the control information carried by the monitored third EPDCCH in the current EPDCCH set in which an EPDCCH needs to be monitored.

Further, if the maximum transmission bandwidth that can be supported by the user equipment is less than the downlink transmission bandwidth of the carrier, and the user equipment has already been accessed to a system, and after a period of time for sending and/or receiving data in a transmission bandwidth, the user equipment may acquire a reconfigured transmission bandwidth according to the received third EPDCCH; therefore, an EPDCCH set in which an EPDCCH needs to be monitored may be determined in real time according to a re-acquired transmission bandwidth, to perform EPDCCH monitoring. DCI corresponding to the third EPDCCH may be the same as the DCI corresponding to the second EPDCCH, and an RNTI used to perform scrambling on CRC for the third EPDCCH may be the same as an RNTI used to perform scrambling on CRC for the second EPDCCH.

Further, optionally, based on the technical solution of the embodiment shown in FIG. 1, the foregoing step 1023 "determine, according to the transmission bandwidth of the user equipment and the configuration information of the at least two enhanced physical downlink control channel EPDCCH sets and from the at least two EPDCCH sets, the at least one EPDCCH set in which an EPDCCH needs to be monitored" includes either the following step 1023*a* or 1023*b*:

1023*a*. Determine, according to the transmission bandwidth of the user equipment and the configuration information and from the at least two EPDCCH sets, that the EPDCCH set in which an EPDCCH needs to be monitored is at least one EPDCCH set whose corresponding physical resource block is located within the transmission bandwidth of the user equipment; or

1023*b*. Determine, according to the transmission bandwidth of the user equipment, a frequency hopping pattern of the transmission bandwidth, and the configuration information of the at least two enhanced physical downlink control channel EPDCCH sets and from the at least two EPDCCH sets, the at least one EPDCCH set in which an EPDCCH needs to be monitored.

That the user equipment determines, based on the transmission bandwidth of the user equipment, the EPDCCH set in which an EPDCCH needs to be monitored may refer to that the user equipment determines that the EPDCCH set in which an EPDCCH needs to be monitored is an EPDCCH set of at least two EPDCCH sets corresponding to the EPDCCH common search space, where a corresponding physical resource block of the EPDCCH set is located within the transmission bandwidth of the user equipment. In this step, that the user equipment determines, based on the transmission bandwidth of the user equipment, the EPDCCH set in which an EPDCCH needs to be monitored may further be that the user equipment determines, based on the transmission bandwidth of the user equipment and the frequency hopping pattern of the transmission bandwidth, the EPDCCH set in which an EPDCCH needs to be monitored. The user equipment may learn a location of a transmission bandwidth in the downlink transmission bandwidth of the carrier in a current subframe according to the frequency hopping pattern of the transmission bandwidth, where the transmission bandwidth is supported by the user equipment, to further determine, from the at least two EPDCCH sets, the EPDCCH set in which an EPDCCH needs to be monitored.

Optionally, based on the embodiment shown in FIG. 1, that the user equipment determines, according to the configuration information of the at least two enhanced physical downlink control channel EPDCCH sets and from the at least two EPDCCH sets, the at least one EPDCCH set in which an EPDCCH needs to be monitored includes:

the user equipment receives a fourth EPDCCH on a first resource, and determines, based on control information carried by the received fourth EPDCCH and the configuration information of the at least two enhanced physical downlink control channel EPDCCH sets and from the at least two EPDCCH sets, the at least one EPDCCH set in which an EPDCCH needs to be monitored.

It should be noted that the fourth EPDCCH may be the first EPDCCH or the second EPDCCH.

Optionally, based on the embodiment shown in FIG. 1, step 103 "the user equipment monitors the at least one EPDCCH set" includes the following step 103*a* or 103*b*:

103*a*. If a maximum transmission bandwidth that can be supported by the user equipment is equal to a downlink transmission bandwidth of a carrier, the at least one EPDCCH set includes each EPDCCH set of the at least two EPDCCH sets, and a sum of maximum blind detection times corresponding to each EPDCCH set of the at least one EPDCCH set is equal to blind detection times corresponding to EPDCCH common search space, where the user equipment monitors an EPDCCH on a resource corresponding to each EPDCCH set of the at least one EPDCCH set.

103*b*. If the maximum transmission bandwidth that can be supported by the user equipment is less than the downlink transmission bandwidth of the carrier, a quantity of EPDCCH sets included in the at least one EPDCCH set is less than a quantity of EPDCCH sets included in the at least two EPDCCH sets, and the sum of the maximum blind detection times corresponding to each EPDCCH set of the at least one EPDCCH set is equal to the blind detection times corresponding to the EPDCCH common search space, where the user equipment monitors the EPDCCH on the resource corresponding to each EPDCCH set of the at least one EPDCCH set.

In this step, if the maximum transmission bandwidth that can be supported by the user equipment is equal to the downlink transmission bandwidth of the carrier, blind detection times corresponding to an EPDCCH of the user equipment is divided in at least two EPDCCH sets corresponding to the EPDCCH common search space, and the user equipment needs to monitor all EPDCCH sets corresponding to the common search space; if the maximum transmission bandwidth that can be supported by the user equipment is less than the downlink transmission bandwidth of the carrier, the blind detection times corresponding to the EPDCCH of the user equipment is divided in the EPDCCH set in which an EPDCCH needs to be monitored by the user equipment.

Optionally, based on the technical solution of the embodiment shown in FIG. 1, the received second EPDCCH, the received third EPDCCH, and the received fourth EPDCCH are EPDCCHs for which cyclic redundancy check CRC is scrambled by using a first RNTI, the first RNTI is shared by a group of user equipments, and transmission bandwidths corresponding to this group of user equipments are the same. For example, this group of user equipments may be a group of MTC users corresponding to a same transmission bandwidth. When there are multiple transmission bandwidths in the carrier that serve the MTC users, the first RNTI may include multiple values, and each value is corresponding to one transmission bandwidth.

Optionally, based on the technical solution of the embodiment shown in FIG. 1, that user equipment acquires configuration information of an EPDCCH set is that the user equipment acquires resource block allocation information of the EPDCCH set, and includes:

the user equipment receives a broadcast channel, where a broadcast message carried by the broadcast channel includes first information that indicates resource allocation of the EPDCCH set, and the broadcast channel is a physical broadcast channel or an enhanced physical broadcast channel; and the user equipment acquires the first information that is in the broadcast message and that indicates resource allocation of the EPDCCH set, to obtain the resource block allocation information of the EPDCCH set.

Optionally, based on the technical solution of the embodiment shown in FIG. 1, a quantity of information bits of the first information is corresponding to N preset physical resource block pairs, and a value of N is the same for all carriers with different downlink transmission bandwidths.

Optionally, based on the technical solution of the embodiment shown in FIG. 1, that the user equipment determines, according to the configuration information and from the EPDCCH set, at least one EPDCCH set in which an EPDCCH needs to be monitored includes:

the user equipment determines, according to the resource block allocation information of the EPDCCH set, a physical resource block pair corresponding to each EPDCCH set of the EPDCCH set; and determines, according to the resource block allocation information of the EPDCCH set, that each EPDCCH set of the EPDCCH set is the EPDCCH set in which an EPDCCH needs to be monitored by the user equipment; and that the user equipment monitors an EPDCCH on a resource corresponding to the at least one EPDCCH set, to acquire control information sent by a base station includes:

the user equipment monitors the EPDCCH on a physical resource block pair corresponding to the EPDCCH set in which an EPDCCH needs to be monitored, to acquire the control information sent by the base station.

Optionally, based on the technical solution of the embodiment shown in FIG. 1, that the user equipment determines, according to the resource block allocation information of the EPDCCH set, a physical resource block pair corresponding to each EPDCCH set of the EPDCCH set includes:

the user equipment determines, according to the resource block allocation information of the EPDCCH set and N preset physical resource blocks, a physical resource block pair that is of the N preset physical resource block pairs and is corresponding to each EPDCCH set of the EPDCCH set.

Optionally, based on the technical solution of the embodiment shown in FIG. 1, that the user equipment acquires configuration information of an enhanced physical downlink control channel EPDCCH set is that the user equipment acquires configuration information of an enhanced physical downlink control channel EPDCCH set corresponding to the enhanced physical downlink control channel EPDCCH common search space.

Optionally, based on the technical solution of the embodiment shown in FIG. 1, before step 1011 "the user equipment receives a first EPDCCH on a first resource", the method further includes: the user equipment receives the broadcast channel, and acquires a location of the first resource according to the broadcast message carried by the broadcast channel.

That is, the location of the first resource is determined according to the broadcast message carried by the broadcast channel.

Specifically, for the first resource in the foregoing steps, any one of the following cases (1) to (2) is included:

(1) The first resource is a first physical resource block set in a first subframe, the first subframe is a next subframe of a subframe in which a synchronization signal and/or a discovery signal are/is carried, and a frequency domain starting location of the first physical resource block set is the same as a frequency domain starting location of a physical resource block set on which a synchronization signal and/or a discovery signal are/is carried.

(2) The first resource is a first physical resource block set in a first subframe, the first subframe is a next subframe of a subframe in which a synchronization signal and/or a discovery signal are/is carried, and there is a predetermined offset between a frequency domain starting location of the first physical resource block set and a frequency domain starting location of a physical resource block set on which a synchronization signal and/or a discovery signal are/is carried.

Optionally, a physical resource block pair corresponding to the first resource is the same as a physical resource block pair corresponding to one EPDCCH set of the at least two EPDCCH sets.

Optionally, a transmission bandwidth corresponding to the first resource is less than or equal to a maximum transmission bandwidth supported by the user equipment, and the maximum transmission bandwidth supported by the user equipment is less than a downlink transmission bandwidth of a carrier. The transmission bandwidth corresponding to the first resource may be less than or equal to a predetermined value, that is, a quantity of physical resource block pairs included in the transmission bandwidth corresponding to the first resource may be less than or equal to the predetermined value. The predetermined value may refer to a maximum transmission bandwidth supported by a type of user equipment in the system, and this type of user equipment may refer to user equipment whose supported maximum transmission bandwidth is less than the downlink transmission bandwidth of the carrier; or the predetermined value may refer to a maximum transmission bandwidth supported by a type of user equipment whose supported maximum transmission bandwidth is the lowest in the system, for example, the predetermined value may be a maximum transmission bandwidth that can be supported by MTC UE. Alternatively, the predetermined value may refer to a quantity of physical resource block pairs included in a maximum transmission bandwidth supported by a type of user equipment in the system, and this type of user equipment may refer to user equipment whose supported maximum transmission bandwidth is less than the downlink transmission bandwidth of the carrier. For example, the predetermined value may be a quantity of physical resource block pairs included in a maximum transmission bandwidth that can be supported by MTC UE.

Figure 2:
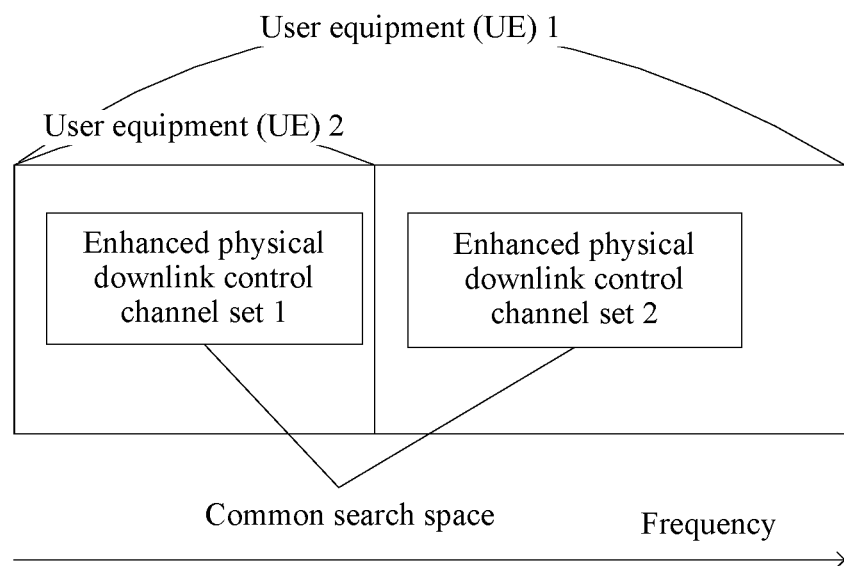
FIG. 2 is a schematic diagram of an EPDCCH set according to an embodiment of the present invention.

In this embodiment of the present invention, based on the foregoing step 101 to step 103, it may be learnt that on a carrier, for example, on a new carrier type carrier, there is only one enhanced physical downlink control channel common search space, and the enhanced physical downlink control channel common search space is corresponding to at least two EPDCCH sets. As shown in FIG. 2, FIG. 2 is a schematic diagram of an EPDCCH set according to an embodiment of the present invention. UE1 is normal user equipment, and UE2 is user equipment whose supported maximum transmission bandwidth is less than a downlink transmission bandwidth of the carrier. It can be seen from FIG. 2 that, for the normal user equipment, that is, user equipment whose supported maximum transmission bandwidth may be equal to the downlink transmission bandwidth of the carrier, the user equipment needs to monitor an EPDCCH on a resource corresponding to all EPDCCH sets corresponding to the enhanced physical downlink control channel common search space; for the user equipment whose supported maximum transmission bandwidth is less than the downlink transmission bandwidth of the carrier, the user equipment needs to monitor an EPDCCH only on a resource corresponding to a part of all the EPDCCH sets corresponding to the enhanced physical downlink control channel common search space. Because an enhanced physical downlink control channel set in which an EPDCCH needs to be monitored by the user equipment whose supported maximum transmission bandwidth is less than the downlink transmission bandwidth of the carrier is a part of enhanced physical downlink control channel sets in which an EPDCCH needs to be monitored by the normal user equipment, the system may put common control information corresponding to the two types of user equipments to the enhanced physical downlink control channel set to perform transmission, where the enhanced physical downlink control channel set is an EPDCCH set in which an EPDCCH needs to be monitored by the user equipment whose supported maximum transmission bandwidth is less than the downlink transmission bandwidth of the carrier; therefore, that same control information needs to be sent on multiple locations on the carrier is avoided, control information overheads are reduced, and spectrum utilization is improved. In addition, compared with a solution of putting all enhanced physical downlink control channel sets to a transmission bandwidth corresponding to user equipment whose supported maximum transmission bandwidth is less than a system bandwidth, the solution of this embodiment also avoids a problem of a limitation on a capacity of a control channel; in addition, normal user equipment may send control information on an EPDCCH set with relatively good channel quality, so that performance of transmitting the control information is improved.

Figure 3:
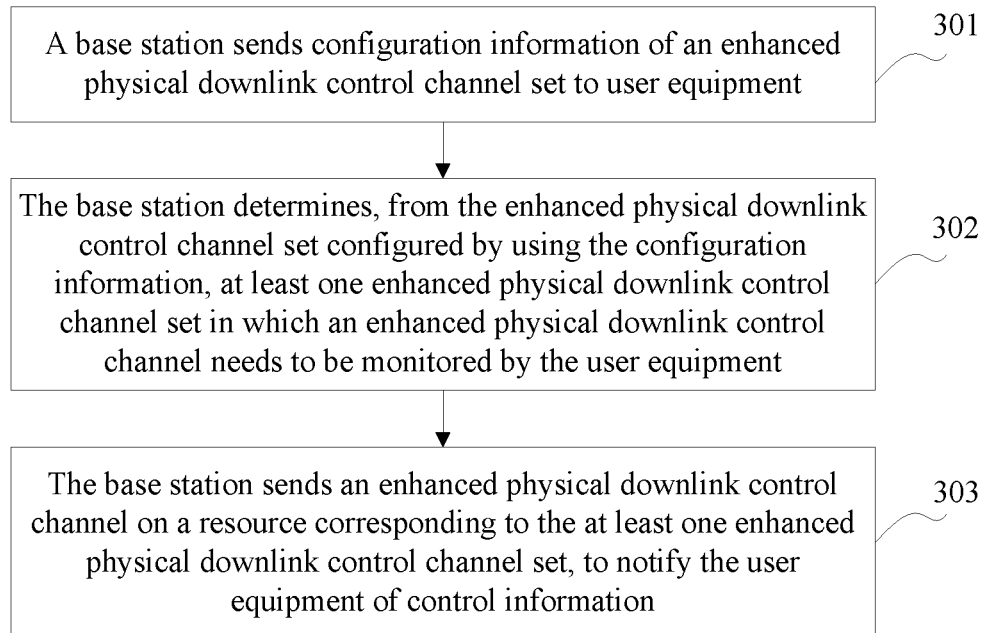
FIG. 3 is a flowchart of a control information transmission method according to an embodiment of the present invention.

FIG. 3 is a flowchart of a control information transmission method according to an embodiment of the present invention. This embodiment of the present invention is executed by a base station. Referring to FIG. 3, the method includes the following steps:

301. The base station sends configuration information of an enhanced physical downlink control channel EPDCCH set to user equipment.

In step 301, the EPDCCH set configured by using the configuration information is an EPDCCH set corresponding to EPDCCH common search space, and the configuration information may be used to configure one or more EPDCCH sets.

When there are multiple EPDCCH sets configured by using the configuration information, different user equipments may determine, according to capabilities of the user equipments and from the configured multiple EPDCCH sets, at least one EPDCCH set in which an EPDCCH needs to be monitored.

Configuration information that is corresponding to each EPDCCH set and is in the configuration information may include information such as a quantity of physical resource block pairs corresponding to the EPDCCH set, a physical resource block pair corresponding to the EPDCCH set, and an identifier of the EPDCCH set. The user equipment may determine, according to configuration information of the at least two EPDCCH sets, information such as a quantity of physical resource block pairs of each EPDCCH set, a physical resource block of each EPDCCH set, and an identifier of the EPDCCH set.

302. The base station determines, from the EPDCCH set configured by using the configuration information, at least one EPDCCH set in which an EPDCCH needs to be monitored by the user equipment.

303. The base station sends an EPDCCH on a resource corresponding to the at least one EPDCCH set, to notify the user equipment of control information.

In this embodiment of the present invention, when quantity of at least one EPDCCH set is less than a quantity of EPDCCH sets corresponding to common search space of a carrier, a base station adds only common control information to a resource corresponding to the at least one EPDCCH set, so that that same control information needs to be sent on multiple locations on the carrier is avoided, control information overheads are reduced, and spectrum utilization is improved.

Optionally, based on the technical solution of the embodiment shown in FIG. 3, that the base station sends configuration information of an EPDCCH set to user equipment is that the base station sends configuration information of at least two EPDCCH sets to the user equipment; the EPDCCH set configured by using the configuration information is the at least two EPDCCH sets configured by using the configuration information.

That is, the configuration information is the configuration information used to configure the at least two EPDCCH sets, and the EPDCCH set configured by using the configuration information is the at least two EPDCCH sets.

Optionally, based on the technical solution of the embodiment shown in FIG. 3, step 301 "the base station sends configuration information of at least two EPDCCH sets to the user equipment" includes the following step 3011:

3011. The base station sends a first EPDCCH to the user equipment on a first resource, so that the user equipment acquires the configuration information of the at least two EPDCCH sets according to control information carried by the first EPDCCH.

It should be noted that the first resource in the embodiment shown in FIG. 3 is similar to the first resource in the embodiment shown in FIG. 1, and details are not described herein again.

Optionally, based on the technical solution of the embodiment shown in FIG. 3, step 301 "the base station sends configuration information of at least two EPDCCH sets to the user equipment" includes the following step 3012:

3012. The base station sends a broadcast channel to the user equipment, so that the user equipment acquires the configuration information of the at least two EPDCCH sets according to a broadcast message carried by the broadcast channel.

The broadcast message includes the configuration information of the at least two EPDCCH sets, that is, the configuration information of the at least two EPDCCH sets is a part of the broadcast message.

Optionally, based on the technical solution of the embodiment shown in FIG. 3, that the base station sends a first EPDCCH to the user equipment on a first resource, so that the user equipment acquires the configuration information of the at least two EPDCCH sets according to control information carried by the first EPDCCH includes:

the base station sends the first EPDCCH to the user equipment on the first resource, and sends a physical downlink shared channel PDSCH on a resource indicated by the first EPDCCH, where the PDSCH carries the configuration information of the at least two EPDCCH sets, so that the user equipment decodes the PDSCH according to the first EPDCCH to acquire the configuration information of the at least two EPDCCH sets; preferably, the configuration information carried by the PDSCH may be SIB information;

the base station sends the first EPDCCH to the user equipment on the first resource, where the control information carried by the first EPDCCH includes the configuration information of the at least two EPDCCH sets, so that the user equipment acquires the configuration information of the at least two EPDCCH sets according to the control information carried by the first EPDCCH.

The base station sends the first EPDCCH to the user equipment on the first resource, and the user equipment receives the first EPDCCH on the first resource, acquires, according to the control information carried by the first EPDCCH, downlink control information DCI corresponding to the first EPDCCH, and acquires the configuration information of the at least two EPDCCH sets according to configuration information carried in the DCI.

Optionally, based on the technical solution of the embodiment shown in FIG. 3, step 3012 "the base station sends a broadcast channel to the user equipment" includes: the base station sends a physical downlink broadcast channel or an enhanced physical downlink broadcast channel to the user equipment.

Optionally, based on the technical solution of the embodiment shown in FIG. 3, step 302 "the base station determines, from the at least two EPDCCH sets configured by using the configuration information, the at least one EPDCCH set in which an EPDCCH needs to be monitored by the user equipment" includes the following steps:

3021. The base station sends transmission bandwidth configuration information to the user equipment.

The transmission bandwidth configuration information is used to indicate a transmission bandwidth of the user equipment.

3022. The base station determines, according to a transmission bandwidth of the user equipment and from the at least two EPDCCH sets configured by using the configuration information, the at least one EPDCCH set in which an EPDCCH needs to be monitored by the user equipment.

The base station determines, according to a physical resource block pair that is corresponding to the at least two EPDCCH sets configured by using the configuration information, and the transmission bandwidth of the user equipment and from the at least two EPDCCH sets, the EPDCCH set in which an EPDCCH needs to be monitored by the user equipment.

Optionally, based on the technical solution of the embodiment shown in FIG. 3, step 3021 "the base station sends transmission bandwidth configuration information to the user equipment" includes the following step 3021a or 3021b:

3021a. The base station sends a second EPDCCH to the user equipment on a first resource, so that the user equipment acquires the transmission bandwidth configuration information according to control information carried by the second EPDCCH.

Specifically, step 3021a may further include either of the following cases: (1) The base station sends the second EPDCCH to the user equipment on the first resource, the user equipment receives the second EPDCCH on the first resource, and the user equipment decodes a physical downlink shared channel PDSCH according to the control information carried by the second EPDCCH, to acquire configuration information carried by the PDSCH, and acquires the transmission bandwidth configuration information according to the configuration information carried by the PDSCH, where the information carried by the PDSCH may be SIB information, but the SIB information is received by only user equipment whose supported maximum transmission bandwidth is less than a system bandwidth. (2) The base station sends the second EPDCCH to the user equipment on the first resource, the user equipment receives the second EPDCCH on the first resource, and the user equipment acquires, according to the control information carried by the second EPDCCH, downlink control information corresponding to the second EPDCCH, and acquires the transmission bandwidth configuration information according to configuration information carried in the downlink control information.

3021b. The base station sends a third EPDCCH on the resource corresponding to the current EPDCCH set in which an EPDCCH needs to be monitored by the user equipment, so that the user equipment acquires the transmission bandwidth configuration information according to control information carried by the third EPDCCH.

This step may be applied to a scenario in which the base station reconfigures the transmission bandwidth of the user equipment. In this case, the base station may send the third EPDCCH on the resource corresponding to the current EPDCCH set in which an EPDCCH is being monitored by the user equipment, to reconfigure the transmission bandwidth of the user equipment. DCI corresponding to the third EPDCCH may be the same as the DCI corresponding to the second EPDCCH, and an RNTI used to perform scrambling on CRC for the third EPDCCH may be the same as an RNTI used to perform scrambling on CRC for the second EPDCCH.

Optionally, based on the technical solution of the embodiment shown in FIG. 3, that the base station sends a second EPDCCH to the user equipment on a first resource includes: the base station performs scrambling on cyclic redundancy check CRC for the second EPDCCH by using a first RNTI, and sends the second EPDCCH to the user equipment on the first resource, where the first RNTI is shared by a group of user equipments, and transmission bandwidths corresponding to this group of user equipments are the same.

Optionally, based on the technical solution of the embodiment shown in FIG. 3, step 3022 "the base station determines, according to a transmission bandwidth of the user equipment and from the at least two EPDCCH sets configured by using the configuration information, the at least one EPDCCH set in which an EPDCCH needs to be monitored by the user equipment" includes the following step 3022a or 3022b:

3022a. The base station determines, according to the transmission bandwidth of the user equipment and from the at least two EPDCCH sets configured by using the configuration information, that the at least one EPDCCH set in which an EPDCCH needs to be monitored by the user equipment is at least one EPDCCH set that is of the at least two EPDCCH sets and whose corresponding physical resource block is located within the transmission bandwidth of the user equipment.

3023b. Determine, according to the transmission bandwidth of the user equipment and a frequency hopping pattern of the transmission bandwidth and from the at least two EPDCCH sets configured by using the configuration information, the at least one EPDCCH set in which an EPDCCH needs to be monitored by the user equipment. The base station may learn a location of a transmission bandwidth in the downlink transmission bandwidth of the carrier in a current subframe according to the frequency hopping pattern of the transmission bandwidth, where the transmission bandwidth is supported by the user equipment, to further determine, from the at least two EPDCCH sets, the EPDCCH set in which an EPDCCH needs to be monitored.

Optionally, based on the technical solution of the embodiment shown in FIG. 3, before the base station sends the first EPDCCH to the user equipment on the first resource, the method further includes:

the base station sends the broadcast message to the user equipment, where the broadcast message carries location indication information of the first resource.

Optionally, a transmission bandwidth corresponding to the first resource is less than or equal to a maximum transmission bandwidth supported by the user equipment, and the maximum transmission bandwidth supported by the user equipment is less than a downlink transmission bandwidth of a carrier.

Optionally, that the base station sends configuration information of an EPDCCH set to user equipment is that the base station sends resource block allocation information of the EPDCCH set to the user equipment, and includes:

the base station sends a broadcast channel, where a broadcast message carried by the broadcast channel includes first information that indicates resource allocation of the EPDCCH set, and the base station sends the resource block allocation information of the EPDCCH set by sending the broadcast channel, where the broadcast channel is a physical broadcast channel or an enhanced physical broadcast channel.

Optionally, a quantity of information bits of the first information is corresponding to N preset physical resource block pairs, and a value of N is the same for all carriers with different downlink transmission bandwidths.

Optionally, that the base station sends configuration information of an enhanced physical downlink control channel EPDCCH set to user equipment is that the base station sends, to the user equipment, configuration information of an enhanced physical downlink control channel EPDCCH set corresponding to enhanced physical downlink control channel EPDCCH common search space.

Because an enhanced physical downlink control channel set monitored by user equipment whose supported maximum transmission bandwidth is less than a downlink transmission bandwidth of a carrier is a part of enhanced physical downlink control channel sets monitored by normal user equipment, a system may put common control information corresponding to the two types of user equipments to the enhanced physical downlink control channel set to perform transmission, where the enhanced physical downlink control channel set is monitored by the user equipment whose supported maximum transmission bandwidth is less than the downlink transmission bandwidth of the carrier; therefore, that same control information needs to be sent on multiple locations on the carrier is avoided, control information overheads are reduced, and spectrum utilization is improved. In addition, compared with a solution of putting all enhanced physical downlink control channel sets to a transmission bandwidth corresponding to the user equipment whose supported maximum transmission bandwidth is less than the downlink transmission bandwidth of the carrier, the solution of this embodiment also avoids a problem of a limitation on a capacity of a control channel; in addition, normal user equipment may send control information on an EPDCCH set with relatively good channel quality, so that performance of transmitting the control information is improved.

Figure 4:
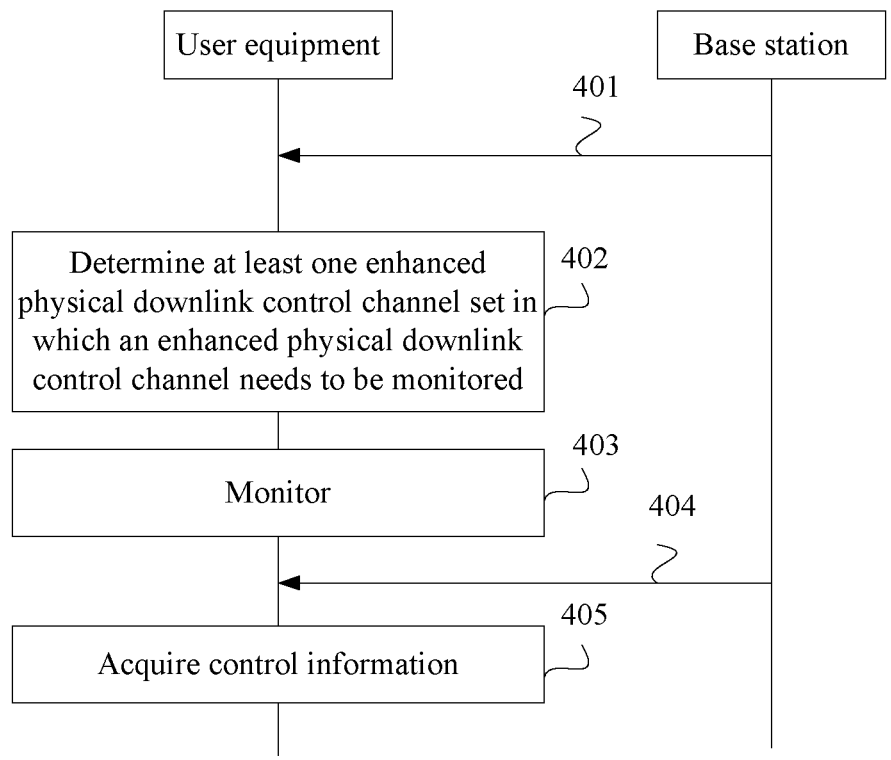
FIG. 4 is a flowchart of a control information transmission method according to an embodiment of the present invention.

To describe a procedure of this embodiment of the present invention more clearly, interaction between a base station and user equipment is used as an example for description. Referring to FIG. 4, this embodiment specifically includes the following steps:

401. The base station sends configuration information of an enhanced physical downlink control channel EPDCCH set to the user equipment.

402. When the user equipment acquires the configuration information of the enhanced physical downlink control channel EPDCCH set, the user equipment determines, according to the configuration information and from the EPDCCH set, at least one EPDCCH set in which an EPDCCH needs to be monitored.

403. The user equipment monitors an EPDCCH on a resource corresponding to the at least one EPDCCH set.

404. The base station sends control information on the resource corresponding to the at least one EPDCCH set.

405. The user equipment acquires the control information that is sent by the base station on the resource corresponding to the at least one EPDCCH set.

Figure 5:
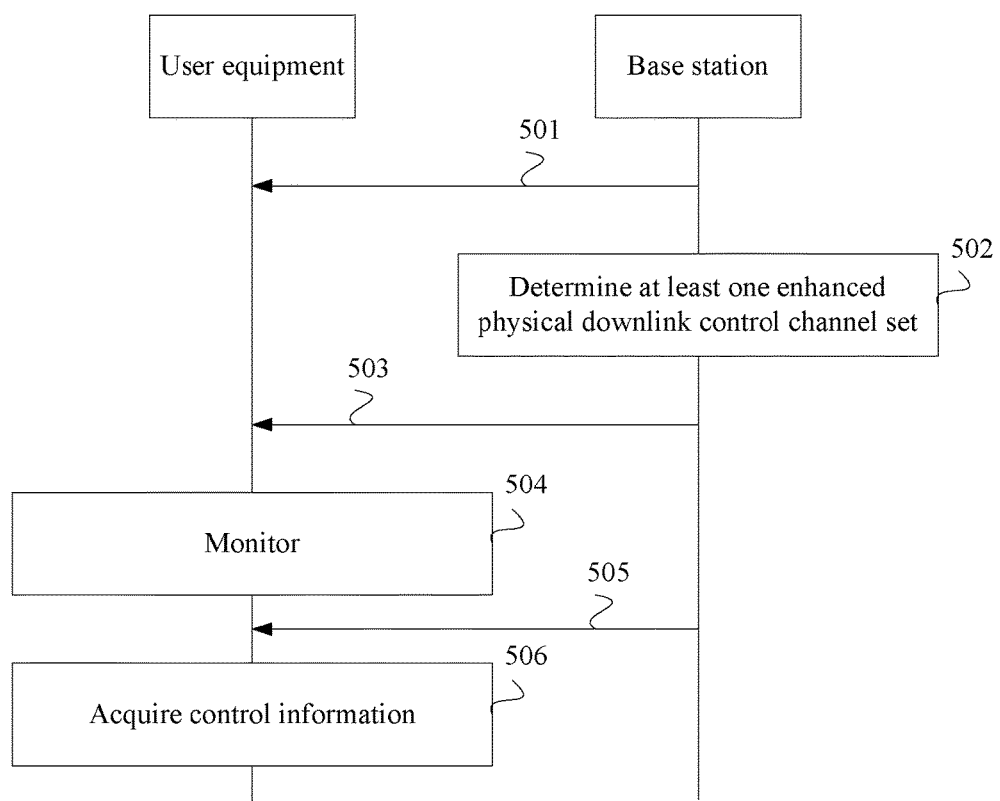
FIG. 5 is a flowchart of a control information transmission method according to an embodiment of the present invention.

The embodiment shown in FIG. 4 is described by using only an example in which user equipment determines an EPDCCH that needs to be monitored. However, actually, a base station may also determine, for the user equipment, an EPDCCH that needs to be monitored. Referring to FIG. 5, this embodiment specifically includes the following steps:

501. The base station sends configuration information of an enhanced physical downlink control channel EPDCCH set to the user equipment.

502. The base station determines at least one EPDCCH set from the EPDCCH set according to the configuration information.

503. The base station instructs the user equipment to monitor the at least one EPDCCH set.

504. The user equipment monitors the at least one EPDCCH set.

505. The base station sends control information on a resource corresponding to the at least one EPDCCH set.

506. The user equipment acquires the control information that is sent by the base station on the resource corresponding to the at least one EPDCCH set.

Figure 6:
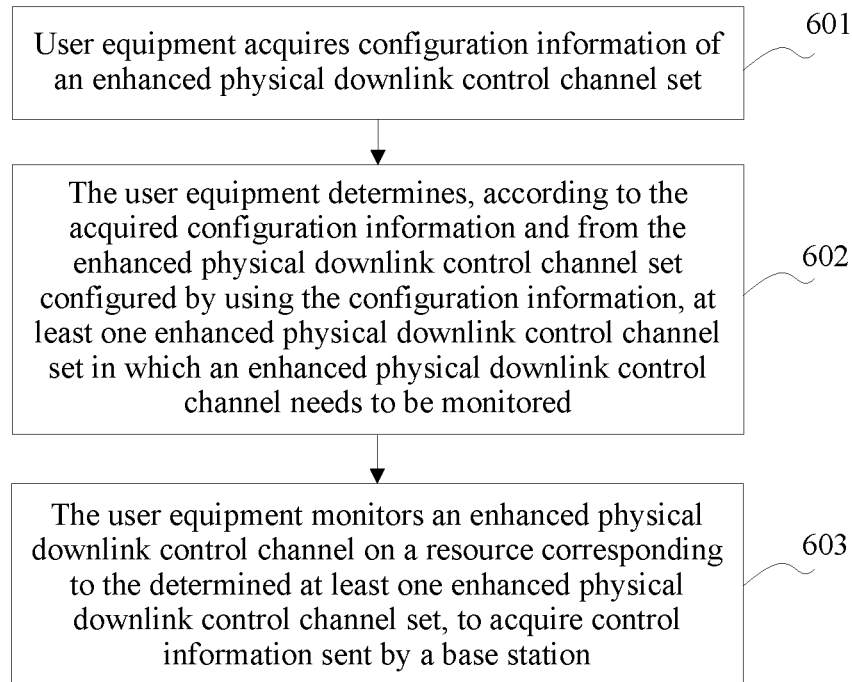
FIG. 6 is a flowchart of a control information transmission method on user equipment according to an embodiment of the present invention.

FIG. 6 is a flowchart of a control information transmission method on user equipment according to an embodiment of the present invention. This embodiment of the present invention is executed by user equipment. Referring to FIG. 6, the method includes the following steps:

601. The user equipment acquires configuration information of an enhanced physical downlink control channel EPDCCH set.

In this step, that the user equipment acquires configuration information of an enhanced physical downlink control channel EPDCCH set may refer to that the user equipment acquires configuration information of an enhanced physical downlink control channel EPDCCH set corresponding to enhanced physical downlink control channel common search space, where the configuration information of the EPDCCH set may refer to resource block allocation information of the EPDCCH set, and the resource block allocation information of the EPDCCH set may include a quantity of physical resource block pairs corresponding to the EPDCCH set, a location, in a frequency domain, of a physical resource block pair corresponding to the EPDCCH set, and the like. Specifically, step 601 may be implemented in the following manner: The user equipment receives a broadcast channel, where a broadcast message carried by the broadcast channel includes first information that indicates resource allocation of the EPDCCH set; and the user equipment acquires the first information that is in the broadcast message and that indicates resource allocation of the EPDCCH set, to obtain the resource block allocation information of the EPDCCH set.

In this manner, a quantity of information bits of the first information is corresponding to N preset physical resource block pairs, where a value of N is the same for all carriers with different downlink transmission bandwidths, N is a positive integer, and the value of N may be 6, 15, 25, or the like. The quantity of information bits of the first information needs to be corresponding to the N preset physical resource block pairs, and two main reasons thereof are as follows: (1) Before successfully decoding the broadcast channel, the user equipment does not know a system bandwidth of a carrier, and a quantity of information bits required by the first information to indicate resource block allocation of the EPDCCH set is related to the bandwidth, and therefore, for the user equipment, the quantity of bits of the first information needs to be fixed; in addition, the user equipment parses the first information according to a bandwidth corresponding to the quantity of bits of the first information, to acquire the resource block allocation information of the EPDCCH set. (2) A value of a quantity of information bits required to indicate the resource block allocation information of the EPDCCH set is relatively large when the system bandwidth is high, the first information is carried on the broadcast channel, and a capacity of the broadcast channel is limited; therefore, it is required to limit that the quantity of information bits of the first information is corresponding to only the N preset physical resource block pairs.

That a quantity of information bits of the first information is corresponding to N preset physical resource block pairs may also refer to that a physical resource block pair that is corresponding to the EPDCCH set and that is indicated by the first information belongs to the N preset physical resource block pairs. Because the EPDCCH set is the EPDCCH set corresponding to the EPDCCH common search space, it is preferred that physical resource block pairs corresponding to the EPDCCH set are discretely distributed in a frequency domain. When the N physical resource block pairs are less than a downlink transmission bandwidth W of a carrier, the N physical resource block pairs may be N predetermined physical resource block pairs in the downlink transmission bandwidth W of the carrier. For example, the N physical resource block pairs may be N physical resource block pairs whose index starts from 0 to N−1 of W physical resource block pairs, or N physical resource blocks that are discretely distributed in W physical resource block pairs.

602. The user equipment determines, according to the acquired configuration information and from the EPDCCH set configured by using the configuration information, at least one EPDCCH set in which an EPDCCH needs to be monitored.

In step 602, when the configuration information acquired in step 601 is the EPDCCH resource block allocation information of the EPDCCH set, the user equipment determines, according to the resource block allocation information of the EPDCCH set, a physical resource block pair corresponding to each EPDCCH set of the EPDCCH set; and determines, according to the resource block allocation information of the EPDCCH set, that each EPDCCH set of the EPDCCH set is the EPDCCH set in which an EPDCCH needs to be monitored by the user equipment. In this case, step 603 is: the user equipment monitors an EPDCCH on a physical resource block pair corresponding to the EPDCCH set in which an EPDCCH needs to be monitored, to acquire control information sent by a base station.

603. The user equipment monitors an EPDCCH on a resource corresponding to the determined at least one EPDCCH set, to acquire control information sent by a base station.

In step 603, the user equipment monitors the EPDCCH on the physical resource block pair corresponding to the at least one EPDCCH set, to acquire the control information sent by the base station.

Figure 7:
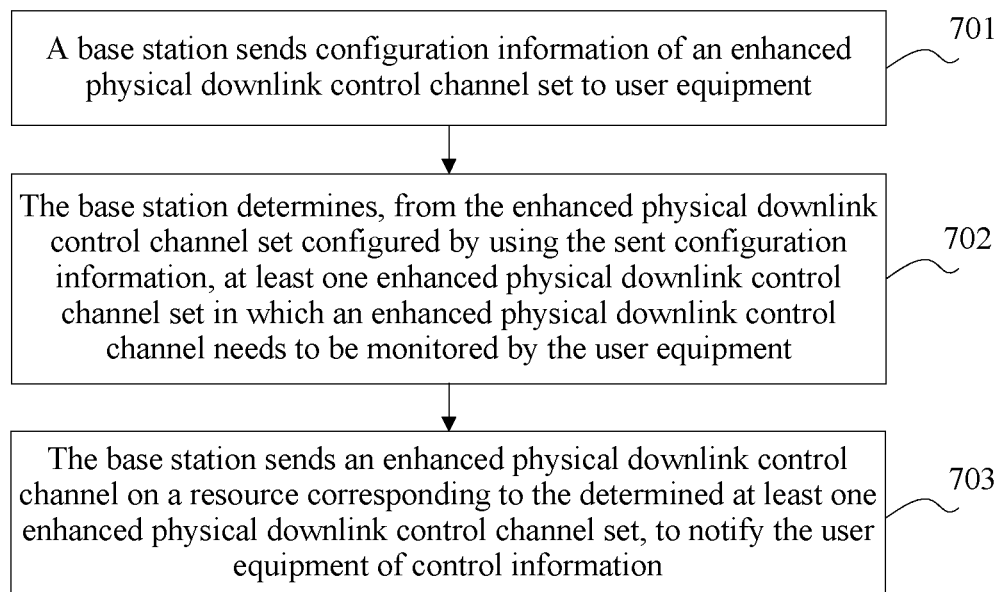
FIG. 7 is a flowchart of a control information transmission method on a base station side according to an embodiment of the present invention.

FIG. 7 is a flowchart of a control information transmission method on a base station side according to an embodiment of the present invention. This embodiment of the present invention is executed by a base station. Referring to FIG. 7, the method includes the following steps:

701. The base station sends configuration information of an enhanced physical downlink control channel EPDCCH set to user equipment.

In this step, that the base station sends configuration information of an enhanced physical downlink control channel EPDCCH set may refer to that the base station sends configuration information of an enhanced physical downlink control channel EPDCCH set corresponding to enhanced physical downlink control channel common search space, where the configuration information of the EPDCCH set may refer to resource block allocation information of the EPDCCH set, and the resource block allocation information of the EPDCCH set may include a quantity of physical resource block pairs corresponding to the EPDCCH set, a location, in a frequency domain, of a physical resource block pair corresponding to the EPDCCH set, and the like. Specifically, this step may be implemented in the following manner:

Manner 1: The base station sends a broadcast channel, where a broadcast message carried by the broadcast channel includes first information that indicates resource allocation of the EPDCCH set, and the base station sends the resource block allocation information of the EPDCCH set by sending the broadcast channel, where the broadcast channel may be a physical broadcast channel or an enhanced physical broadcast channel.

In this manner, a quantity of information bits of the first information is corresponding to N preset physical resource block pairs, where a value of N is the same for all carriers with different downlink transmission bandwidths, N is a positive integer, and the value of N may be 6, 15, 25, or the like.

That a quantity of information bits of the first information is corresponding to N preset physical resource block pairs may also refer to that a physical resource block pair that is corresponding to the EPDCCH set and that is indicated by the first information belongs to the N preset physical resource block pairs. Because the EPDCCH set is the EPDCCH set corresponding to the EPDCCH common search space, it is preferred that physical resource block pairs corresponding to the EPDCCH set are discretely distributed in a frequency domain. When the N physical resource block pairs are less than a downlink transmission bandwidth W of a carrier, the N physical resource block pairs may be N predetermined physical resource block pairs in W. For example, the N physical resource block pairs may be N physical resource block pairs whose index starts from 0 to N-1 of W physical resource block pairs, or N physical resource blocks that are discretely distributed in W physical resource block pairs.

702. The base station determines, from the EPDCCH set configured by using the sent configuration information, at least one EPDCCH set in which an EPDCCH needs to be monitored by the user equipment.

In this step, the base station determines, according to a physical resource block pair corresponding to each EPDCCH set of the EPDCCH set that is configured by using the sent configuration information in step 701, that each EPDCCH set of the EPDCCH set is the EPDCCH set in which an EPDCCH needs to be monitored by the user equipment. In this case, step 703 is: the base station sends an EPDCCH on a resource corresponding to the determined at least one EPDCCH set, to notify the user equipment of control information.

703. The base station sends an EPDCCH on a resource corresponding to the determined at least one EPDCCH set, to notify the user equipment of control information.

In this step, the base station may send the EPDCCH on a physical resource block pair corresponding to the at least one EPDCCH set determined in step 702, to notify the user equipment of the control information.

In this embodiment of the present invention, resource block allocation information of an EPDCCH set corresponding to EPDCCH common search space is carried on a broadcast channel, and then is notified to user equipment, and the resource block allocation information is corresponding to N preset physical resource block pairs, which resolves a design problem of EPDCCH common search space on a New Carrier Type carrier, so that the user equipment acquires control information according to configured common search space.

Figure 8:
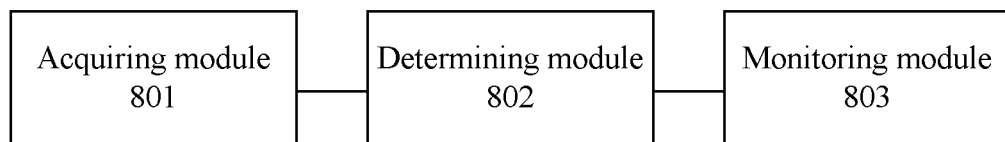
FIG. 8 is a schematic structural diagram of user equipment according to an embodiment of the present invention.

FIG. 8 is a schematic structural diagram of user equipment according to an embodiment of the present invention. Referring to FIG. 8, the user equipment includes: an acquiring module 801, configured to acquire configuration information of an enhanced physical downlink control channel EPDCCH set; a determining module 802, configured to determine, according to the configuration information and from the EPDCCH set, at least one EPDCCH set in which an EPDCCH needs to be monitored by the user equipment; and a monitoring module 803, configured to monitor an EPDCCH on a resource corresponding to the at least one EPDCCH set, to acquire control information sent by a base station.

Optionally, the acquiring module 801 is configured to acquire configuration information of at least two enhanced physical downlink control channel EPDCCH sets; and the determining module is configured to determine, according to the configuration information of the at least two enhanced physical downlink control channel EPDCCH sets and from the at least two EPDCCH sets, the at least one EPDCCH set in which an EPDCCH needs to be monitored.

Optionally, the acquiring module 801 is configured to: receive a first EPDCCH on a first resource, and acquire the configuration information of the at least two EPDCCH sets according to control information carried by the first EPDCCH; or the acquiring module 801 is configured to: receive a broadcast channel, and acquire the configuration information of the at least two EPDCCH sets according to a broadcast message carried by the broadcast channel.

Optionally, the acquiring module 801 is configured to: receive the first EPDCCH on the first resource; decode a physical downlink shared channel PDSCH according to the control information carried by the first EPDCCH, to acquire configuration information carried by the PDSCH; and acquire the configuration information of the at least two EPDCCH sets according to the configuration information carried by the PDSCH; or the acquiring module 801 is configured to: receive the first EPDCCH on the first resource, acquire, according to the control information carried by the first EPDCCH, downlink control information DCI corresponding to the first EPDCCH, and acquire the configuration information of the at least two EPDCCH sets according to configuration information carried in the DCI.

Optionally, the acquiring module 801 is configured to: receive a physical downlink broadcast channel or an enhanced physical downlink broadcast channel, and acquire the configuration information of the at least two EPDCCH sets according to a broadcast message carried by the physical downlink broadcast channel or the enhanced physical downlink broadcast channel.

Optionally, the determining module 802 includes:

a bandwidth configuration information acquiring unit, configured to acquire transmission bandwidth configuration information;

a transmission bandwidth acquiring unit, configured to acquire a transmission bandwidth of the user equipment according to the transmission bandwidth configuration information; and a determining unit, configured to determine, according to the transmission bandwidth of the user equipment and the configuration information of the at least two enhanced physical downlink control channel EPDCCH sets and from the at least two EPDCCH sets, the at least one EPDCCH set in which an EPDCCH needs to be monitored.

Optionally, the bandwidth configuration information acquiring unit is configured to: receive a second EPDCCH on a first resource, and acquire the transmission bandwidth configuration information according to control information carried by the second EPDCCH; or the bandwidth configuration information acquiring unit is configured to: monitor a third EPDCCH on the resource corresponding to the current EPDCCH set in which an EPDCCH needs to be monitored, and acquire the transmission bandwidth configuration information according to control information carried by the third EPDCCH.

Optionally, the second EPDCCH received on the first resource is an EPDCCH for which cyclic redundancy check CRC is scrambled by using a first RNTI, the first RNTI is shared by a group of user equipments, and transmission bandwidths corresponding to this group of user equipments are the same.

Optionally, the determining unit is configured to determine, according to the transmission bandwidth of the user equipment and the configuration information of the at least two EPDCCH sets and from the at least two EPDCCH sets, that the EPDCCH set in which an EPDCCH needs to be monitored is at least one EPDCCH set whose corresponding physical resource block is located within the transmission bandwidth of the user equipment, or the determining unit is configured to determine, according to the transmission bandwidth of the user equipment, a frequency hopping pattern of the transmission bandwidth, and the configuration information of the at least two enhanced physical downlink control channel EPDCCH sets and from the at least two EPDCCH sets, the at least one EPDCCH set in which an EPDCCH needs to be monitored.

Optionally, the determining module 802 is configured to: receive a fourth EPDCCH on a first resource, and determine, based on control information carried by the received fourth EPDCCH and the configuration information of the at least two enhanced physical downlink control channel EPDCCH sets and from the at least two EPDCCH sets, the at least one EPDCCH set in which an EPDCCH needs to be monitored.

Optionally, the user equipment further includes: a broadcast channel receiving module, configured to: receive the broadcast channel, and acquire a location of the first resource according to the broadcast message carried by the broadcast channel.

Optionally, the first resource is a first physical resource block set in a first subframe, the first subframe is a next subframe of a subframe in which a synchronization signal and/or a discovery signal are/is carried, and a frequency domain starting location of the first physical resource block set is the same as a frequency domain starting location of a physical resource block set on which a synchronization signal and/or a discovery signal are/is carried; or the first resource is a first physical resource block set in a first subframe, the first subframe is a next subframe of a subframe in which a synchronization signal and/or a discovery signal are/is carried, and there is a predetermined offset between a frequency domain starting location of the first physical resource block set and a frequency domain starting location of a physical resource block set on which a synchronization signal and/or a discovery signal are/is carried.

Optionally, a physical resource block pair corresponding to the first resource is the same as a physical resource block pair corresponding to one EPDCCH set of the at least two EPDCCH sets.

Optionally, a transmission bandwidth corresponding to the first resource is less than or equal to a maximum transmission bandwidth supported by the user equipment, and the maximum transmission bandwidth supported by the user equipment is less than a downlink transmission bandwidth of a carrier.

Optionally, the monitoring module 803 is configured to: if a maximum transmission bandwidth that can be supported by the user equipment is equal to a downlink transmission bandwidth of a carrier, the at least one EPDCCH set includes each EPDCCH set of the at least two EPDCCH sets, and a sum of maximum blind detection times corresponding to each EPDCCH set of the at least one EPDCCH set is equal to blind detection times corresponding to EPDCCH common search space, where the user equipment monitors an EPDCCH on a resource corresponding to each EPDCCH set of the at least one EPDCCH set; and the monitoring module 803 is configured to: if the maximum transmission bandwidth that can be supported by the user equipment is less than the downlink transmission bandwidth of the carrier, a quantity of EPDCCH sets included in the at least one EPDCCH set is less than a quantity of EPDCCH sets included in the at least two EPDCCH sets, and the sum of the maximum blind detection times corresponding to each EPDCCH set of the at least one EPDCCH set is equal to the blind detection times corresponding to the EPDCCH common search space, where the user equipment monitors the EPDCCH on the resource corresponding to each EPDCCH set of the at least one EPDCCH set.

Optionally, the configuration information of the EPDCCH set is resource block allocation information of the EPDCCH set, and the acquiring module 801 includes:

a receiving unit, configured to receive a broadcast channel, where a broadcast message carried by the broadcast channel includes first information that indicates resource allocation of the EPDCCH set, and the broadcast channel is a physical broadcast channel or an enhanced physical broadcast channel; and a first-information acquiring unit, configured to acquire the first information that is in the broadcast message and that indicates resource allocation of the EPDCCH set, to obtain the resource block allocation information of the EPDCCH set.

Optionally, a quantity of information bits of the first information is corresponding to N preset physical resource block pairs, and a value of N is the same for all carriers with different downlink transmission bandwidths.

Optionally, the determining module 802 is configured to: determine, according to the resource block allocation information of the EPDCCH set, a physical resource block pair corresponding to each EPDCCH set of the EPDCCH set; and determine, according to the resource block allocation information of the EPDCCH set, that each EPDCCH set of the EPDCCH set is the EPDCCH set in which an EPDCCH needs to be monitored by the user equipment; and accordingly, the monitoring module 803 is configured to monitor the EPDCCH on a physical resource block pair corresponding to the EPDCCH set in which an EPDCCH needs to be monitored, to acquire the control information sent by the base station.

Optionally, the determining module 802 is configured to determine, according to the resource block allocation information of the EPDCCH set and N preset physical resource blocks, a physical resource block pair that is of the N preset physical resource block pairs and is corresponding to each EPDCCH set of the EPDCCH set.

Optionally, that the user equipment acquires the configuration information of the enhanced physical downlink control channel EPDCCH set is that the user equipment acquires configuration information of an enhanced physical downlink control channel EPDCCH set corresponding to the enhanced physical downlink control channel EPDCCH common search space.

Figure 9:
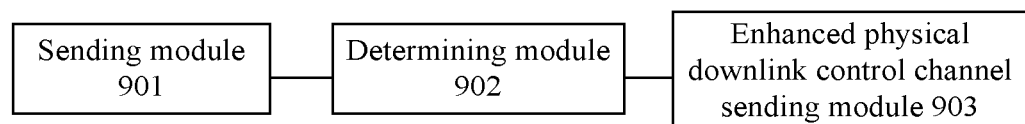
FIG. 9 is a schematic structural diagram of a base station according to an embodiment of the present invention.

FIG. 9 is a schematic structural diagram of a base station according to an embodiment of the present invention. Referring to FIG. 9, the base station includes:

a sending module 901, configured to send configuration information of an enhanced physical downlink control channel EPDCCH set to user equipment;

a determining module 902, configured to determine, from the EPDCCH set configured by using the configuration information, at least one EPDCCH set in which an EPDCCH needs to be monitored by the user equipment; and an EPDCCH sending module 903, configured to send an EPDCCH on a resource corresponding to the at least one EPDCCH set, to notify the user equipment of control information.

Optionally, the sending configuration information of an EPDCCH set to user equipment is sending, by the base station, configuration information of at least two EPDCCH sets to the user equipment; and the EPDCCH set configured by using the configuration information is the at least two EPDCCH sets configured by using the configuration information.

Optionally, the sending module is configured to send a first EPDCCH to the user equipment on a first resource, so that the user equipment acquires the configuration information of the at least two EPDCCH sets according to control information carried by the first EPDCCH; or the sending module is configured to send a broadcast channel to the user equipment, so that the user equipment acquires the configuration information of the at least two EPDCCH sets according to a broadcast message carried by the broadcast channel.

Optionally, the sending module is configured to: send the first EPDCCH to the user equipment on the first resource, and send a physical downlink shared channel PDSCH on a resource indicated by the first EPDCCH, where the PDSCH carries the configuration information of the at least two EPDCCH sets, so that the user equipment decodes the PDSCH according to the first EPDCCH to acquire the configuration information of the at least two EPDCCH sets; or the sending module is configured to send the first EPD-CCH to the user equipment on the first resource, where the control information carried by the first EPDCCH includes the configuration information of the at least two EPDCCH sets, so that the user equipment acquires the configuration information of the at least two EPDCCH sets according to the control information carried by the first EPDCCH.

Optionally, the sending module is configured to send a physical downlink broadcast channel or an enhanced physical downlink broadcast channel to the user equipment.

Optionally, the sending module is configured to send transmission bandwidth configuration information to the user equipment; and the determining module is configured to determine, according to a transmission bandwidth of the user equipment and from the at least two EPDCCH sets configured by using the configuration information, the at least one EPDCCH set in which an EPDCCH needs to be monitored by the user equipment.

Optionally, the sending module is configured to send a second EPDCCH to the user equipment on a first resource, so that the user equipment acquires the transmission bandwidth configuration information according to control information carried by the second EPDCCH; or the sending module is configured to send a third EPDCCH on the resource corresponding to the current EPDCCH set in which an EPDCCH needs to be monitored by the user equipment, so that the user equipment acquires the transmission bandwidth configuration information according to control information carried by the third EPDCCH.

Optionally, the sending module is configured to: perform scrambling on cyclic redundancy check CRC for the second EPDCCH by using a first RNTI, and send the second EPDCCH to the user equipment on the first resource, where the first RNTI is shared by a group of user equipments, and transmission bandwidths corresponding to this group of user equipments are the same.

Optionally, the determining module is configured to determine, according to the transmission bandwidth of the user equipment and from the at least two EPDCCH sets configured by using the configuration information, that the at least one EPDCCH set in which an EPDCCH needs to be monitored by the user equipment is at least one EPDCCH set that is of the at least two EPDCCH sets and whose corresponding physical resource block is located within the transmission bandwidth of the user equipment; or the determining module is configured to determine, according to the transmission bandwidth of the user equipment and a frequency hopping pattern of the transmission bandwidth and from the at least two EPDCCH sets configured by using the configuration information, the at least one EPDCCH set in which an EPDCCH needs to be monitored by the user equipment.

Optionally, the sending module is further configured to send the broadcast message to the user equipment, where the broadcast message carries location indication information of the first resource.

Optionally, the first resource is a first physical resource block set in a first subframe, the first subframe is a next subframe of a subframe in which a synchronization signal and/or a discovery signal are/is carried, and a frequency domain starting location of the first physical resource block set is the same as a frequency domain starting location of a physical resource block set on which a synchronization signal and/or a discovery signal are/is carried; or the first resource is a first physical resource block set in a first subframe, the first subframe is a next subframe of a subframe in which a synchronization signal and/or a discovery signal are/is carried, and there is a predetermined offset between a frequency domain starting location of the first physical resource block set and a frequency domain starting location of a physical resource block set on which a synchronization signal and/or a discovery signal are/is carried.

Optionally, a physical resource block pair corresponding to the first resource is the same as a physical resource block pair corresponding to one EPDCCH set of the at least two EPDCCH sets.

Optionally, a transmission bandwidth corresponding to the first resource is less than or equal to a maximum transmission bandwidth supported by the user equipment, and the maximum transmission bandwidth supported by the user equipment is less than a downlink transmission bandwidth of a carrier.

Optionally, the sending module is configured to send a broadcast channel, where a broadcast message carried by the broadcast channel includes first information that indicates resource allocation of the EPDCCH set, and resource block allocation information of the EPDCCH set is sent by sending the broadcast channel, where the broadcast channel is a physical broadcast channel or an enhanced physical broadcast channel.

Optionally, a quantity of information bits of the first information is corresponding to N preset physical resource block pairs, and a value of N is the same for all carriers with different downlink transmission bandwidths.

Optionally, the sending configuration information of an enhanced physical downlink control channel EPDCCH set to user equipment is sending, by the base station to the user equipment, configuration information of an enhanced physical downlink control channel EPDCCH set corresponding to enhanced physical downlink control channel EPDCCH common search space.

The foregoing sending module 901 may be a transmitter or a transceiver, the foregoing EPDCCH sending module 903 may be a receiver or a transceiver, and the sending module 901 and the EPDCCH sending module 903 may be integrated to constitute a transceiver unit, which is implemented as a transceiver in hardware.

It should be noted that: When the device provided in the foregoing embodiment performs control information transmission, the division of the foregoing functional modules is merely used as an example for description. In an actual application, the functions may be allocated to different functional modules for implementation as required. That is, an internal structure of the device is divided into different functional modules to implement all or part of the functions described above. In addition, the device provided in the foregoing embodiment and the control information transmission method embodiments pertain to a same concept. For a specific implementation process of the device, reference may be made to the method embodiments, and details are not described herein again.

Figure 10:
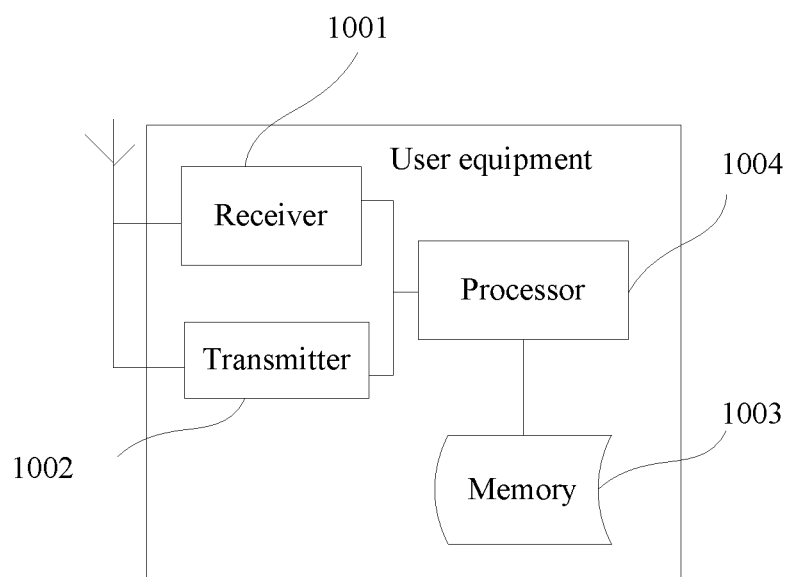
FIG. 10 is a schematic structural diagram of user equipment according to an embodiment of the present invention.

FIG. 10 is a schematic structural diagram of user equipment according to an embodiment of the present invention. Referring to FIG. 10, the user equipment includes: a receiver 1001, a transmitter 1002, a memory 1003, and a processor 1004, where the receiver 1001 and the transmitter 1002 are separately connected to the processor 1004, the memory 1003 stores program code, and the processor 1004 is configured to invoke the program code and execute the following operations: acquiring configuration information of an enhanced physical downlink control channel EPDCCH set; determining, according to the configuration information and from the EPDCCH set, at least one EPDCCH set in which an EPDCCH needs to be monitored; and monitoring an EPDCCH on a resource corresponding to the at least one EPDCCH set, to acquire control information sent by a base station.

Optionally, the processor 1004 is further configured to invoke the program code and execute the following operation: acquiring, by the user equipment, configuration information of at least two enhanced physical downlink control channel EPDCCH sets; and accordingly, the determining, by the user equipment according to the configuration information and from the EPDCCH set, at least one EPDCCH set in which an EPDCCH needs to be monitored includes:

determining, by the user equipment according to the configuration information of the at least two enhanced physical downlink control channel EPDCCH sets and from the at least two EPDCCH sets, the at least one EPDCCH set in which an EPDCCH needs to be monitored.

Optionally, the processor 1004 is further configured to invoke the program code and execute the following operation:

receiving, by the user equipment, a first EPDCCH on a first resource, and acquiring the configuration information of the at least two EPDCCH sets according to control information carried by the first EPDCCH; or receiving, by the user equipment, a broadcast channel, and acquiring the configuration information of the at least two EPDCCH sets according to a broadcast message carried by the broadcast channel.

Optionally, the processor 1004 is further configured to invoke the program code and execute the following operation:

receiving, by the user equipment, the first EPDCCH on the first resource, decoding a physical downlink shared channel PDSCH according to the control information carried by the first EPDCCH, to acquire configuration information carried by the PDSCH, and acquiring the configuration information of the at least two EPDCCH sets according to the configuration information carried by the PDSCH; or receiving, by the user equipment, the first EPDCCH on the first resource, acquiring, according to the control information carried by the first EPDCCH, downlink control information DCI corresponding to the first EPDCCH, and acquiring the configuration information of the at least two EPDCCH sets according to configuration information carried in the DCI.

Optionally, the processor 1004 is further configured to invoke the program code and execute the following operations:

receiving, by the user equipment, a physical downlink broadcast channel or an enhanced physical downlink broadcast channel; and acquiring, by the user equipment, the configuration information of the at least two EPDCCH sets according to a broadcast message carried by the physical downlink broadcast channel or the enhanced physical downlink broadcast channel.

Optionally, the processor 1004 is further configured to invoke the program code and execute the following operations: acquiring, by the user equipment, configuration information of at least two enhanced physical downlink control channel EPDCCH sets;

acquiring, by the user equipment, transmission bandwidth configuration information;

acquiring a transmission bandwidth of the user equipment according to the transmission bandwidth configuration information; and determining, according to the transmission bandwidth of the user equipment and the configuration information of the at least two enhanced physical downlink control channel EPDCCH sets and from the at least two EPDCCH sets, the at least one EPDCCH set in which an EPDCCH needs to be monitored.

Optionally, the processor 1004 is further configured to invoke the program code and execute the following operations: acquiring, by the user equipment, configuration information of at least two enhanced physical downlink control channel EPDCCH sets; and receiving, by the user equipment, a second EPDCCH on a first resource, and acquiring the transmission bandwidth configuration information according to control information carried by the second EPDCCH; or monitoring, by the user, a third EPDCCH on the resource corresponding to the current EPDCCH set in which an EPDCCH needs to be monitored, and acquiring the transmission bandwidth configuration information according to control information carried by the third EPDCCH.

Optionally, the processor 1004 is further configured to invoke the program code and execute the following operation: acquiring, by the user equipment, configuration information of at least two enhanced physical downlink control channel EPDCCH sets, where the second EPDCCH received by the user equipment on the first resource is an EPDCCH for which cyclic redundancy check CRC is scrambled by using a first RNTI, the first RNTI is shared by a group of user equipments, and transmission bandwidths corresponding to this group of user equipments are the same.

Optionally, the processor 1004 is further configured to invoke the program code and execute the following operations: acquiring, by the user equipment, configuration information of at least two enhanced physical downlink control channel EPDCCH sets; and determining, according to the transmission bandwidth of the user equipment and the configuration information of the at least two EPDCCH sets and from the at least two EPDCCH sets, that the EPDCCH set in which an EPDCCH needs to be monitored is at least one EPDCCH set whose corresponding physical resource block is located within the transmission bandwidth of the user equipment, or determining, according to the transmission bandwidth of the user equipment, a frequency hopping pattern of the transmission bandwidth, and the configuration information of the at least two enhanced physical downlink control channel EPDCCH sets and from the at least two EPDCCH sets, the at least one EPDCCH set in which an EPDCCH needs to be monitored.

Optionally, the processor 1004 is further configured to invoke the program code and execute the following operations: acquiring, by the user equipment, configuration information of at least two enhanced physical downlink control channel EPDCCH sets; and receiving, by the user equipment, a fourth EPDCCH on a first resource, and determining, based on control information carried by the received fourth EPDCCH and the configuration information of the at least two enhanced physical downlink control channel EPDCCH sets and from the at least two EPDCCH sets, the at least one EPDCCH set in which an EPDCCH needs to be monitored.

Optionally, the processor 1004 is further configured to invoke the program code and execute the following operations: acquiring, by the user equipment, configuration information of at least two enhanced physical downlink control channel EPDCCH sets; and receiving, by the user equipment, the broadcast channel, and acquiring a location of the first resource according to the broadcast message carried by the broadcast channel.

Optionally, the first resource is a first physical resource block set in a first subframe, the first subframe is a next subframe of a subframe in which a synchronization signal and/or a discovery signal are/is carried, and a frequency domain starting location of the first physical resource block set is the same as a frequency domain starting location of a physical resource block set on which a synchronization signal and/or a discovery signal are/is carried; or the first resource is a first physical resource block set in a first subframe, the first subframe is a next subframe of a subframe in which a synchronization signal and/or a discovery signal are/is carried, and there is a predetermined offset between a frequency domain starting location of the first physical resource block set and a frequency domain starting location of a physical resource block set on which a synchronization signal and/or a discovery signal are/is carried.

Optionally, a physical resource block pair corresponding to the first resource is the same as a physical resource block pair corresponding to one EPDCCH set of the at least two EPDCCH sets.

Optionally, a transmission bandwidth corresponding to the first resource is less than or equal to a maximum transmission bandwidth supported by the user equipment, and the maximum transmission bandwidth supported by the user equipment is less than a downlink transmission bandwidth of a carrier.

Optionally, the processor 1004 is further configured to invoke the program code and execute the following operation: if a maximum transmission bandwidth that can be supported by the user equipment is equal to a downlink transmission bandwidth of a carrier, the at least one EPDCCH set includes each EPDCCH set of the at least two EPDCCH sets, and a sum of maximum blind detection times corresponding to each EPDCCH set of the at least one EPDCCH set is equal to blind detection times corresponding to EPDCCH common search space, where the user equipment monitors an EPDCCH on a resource corresponding to each EPDCCH set of the at least one EPDCCH set; and if the maximum transmission bandwidth that can be supported by the user equipment is less than the downlink transmission bandwidth of the carrier, a quantity of EPDCCH sets included in the at least one EPDCCH set is less than a quantity of EPDCCH sets included in the at least two EPDCCH sets, and the sum of the maximum blind detection times corresponding to each EPDCCH set of the at least one EPDCCH set is equal to the blind detection times corresponding to the EPDCCH common search space, where the user equipment monitors the EPDCCH on the resource corresponding to each EPDCCH set of the at least one EPDCCH set.

Optionally, the processor 1004 is further configured to invoke the program code and execute the following operations: receiving, by the user equipment, a broadcast channel, where a broadcast message carried by the broadcast channel includes first information that indicates resource allocation of the EPDCCH set, and the broadcast channel is a physical broadcast channel or an enhanced physical broadcast channel; and acquiring, by the user equipment, the first information that is in the broadcast message and that indicates resource allocation of the EPDCCH set, to obtain resource block allocation information of the EPDCCH set.

Optionally, a quantity of information bits of the first information is corresponding to N preset physical resource block pairs, and a value of N is the same for all carriers with different downlink transmission bandwidths.

Optionally, the processor 1004 is further configured to invoke the program code and execute the following operations: determining, by the user equipment according to the resource block allocation information of the EPDCCH set, a physical resource block pair corresponding to each EPDCCH set of the EPDCCH set; and determining, according to the resource block allocation information of the EPDCCH set, that each EPDCCH set of the EPDCCH set is the EPDCCH set in which an EPDCCH needs to be monitored by the user equipment; and the monitoring, by the user equipment, an EPDCCH on a resource corresponding to the at least one EPDCCH set, to acquire control information sent by a base station includes:

monitoring, by the user equipment, the EPDCCH on a physical resource block pair corresponding to the EPDCCH set in which an EPDCCH needs to be monitored, to acquire the control information sent by the base station.

Optionally, the processor 1004 is further configured to invoke the program code and execute the following operation: determining, by the user equipment according to the resource block allocation information of the EPDCCH set and N preset physical resource blocks, a physical resource block pair that is of the N preset physical resource block pairs and is corresponding to each EPDCCH set of the EPDCCH set.

Optionally, that the user equipment acquires the configuration information of the enhanced physical downlink control channel EPDCCH set is that the user equipment acquires configuration information of an enhanced physical downlink control channel EPDCCH set corresponding to the enhanced physical downlink control channel EPDCCH common search space.

Figure 11:
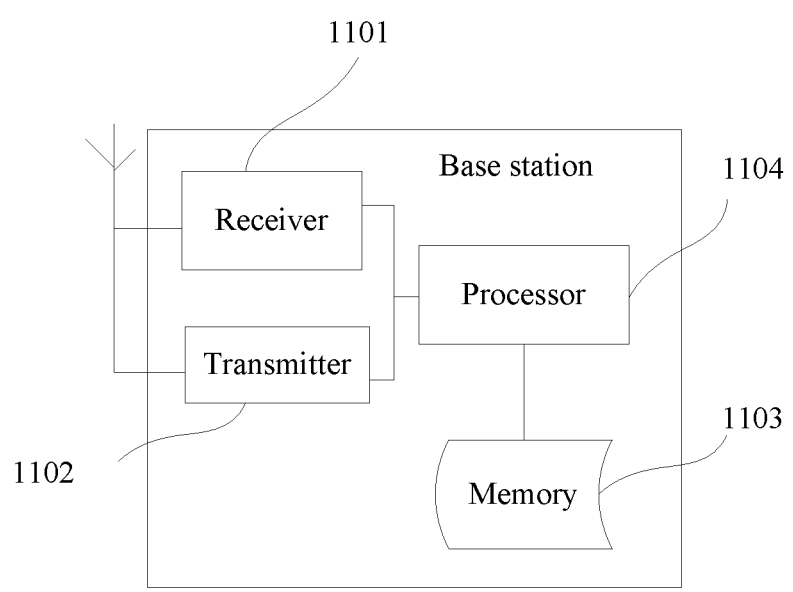
FIG. 11 is a schematic structural diagram of a base station according to an embodiment of the present invention.

FIG. 11 is a schematic structural diagram of a base station according to an embodiment of the present invention. Referring to FIG. 11, the base station includes: a receiver 1101, a transmitter 1102, a memory 1103, and a processor 1104, where the receiver 1101 and the transmitter 1102 are separately connected to the processor 1104. Certainly, the base station may further include general components, such as an antenna, a baseband processing component, an intermediate radio frequency processing component, and an input and output apparatus, which is not limited herein in this embodiment of the present invention.

The memory 1103 stores program code, and the processor 1104 is configured to invoke the program code and execute the following operations: sending configuration information of an enhanced physical downlink control channel EPDCCH set to user equipment; determining, from the EPDCCH set configured by using the configuration information, at least one EPDCCH set in which an EPDCCH needs to be monitored by the user equipment; and sending an EPDCCH on a resource corresponding to the at least one EPDCCH set, to notify the user equipment of control information.

Optionally, that the base station sends the configuration information of the EPDCCH set to the user equipment is that the base station sends configuration information of at least two EPDCCH sets to the user equipment, where the EPDCCH set configured by using the configuration information is the at least two EPDCCH sets configured by using the configuration information.

Optionally, the processor 1104 is further configured to invoke the program code and execute the following operation: sending a first EPDCCH to the user equipment on a first resource, so that the user equipment acquires the configuration information of the at least two EPDCCH sets according to control information carried by the first EPDCCH; or sending a broadcast channel to the user equipment, so that the user equipment acquires the configuration information of the at least two EPDCCH sets according to a broadcast message carried by the broadcast channel.

Optionally, the processor 1104 is further configured to invoke the program code and execute the following operations: sending the first EPDCCH to the user equipment on the first resource, and sending a physical downlink shared channel PDSCH on a resource indicated by the first EPDCCH, where the PDSCH carries the configuration information of the at least two EPDCCH sets, so that the user equipment decodes the PDSCH according to the first EPDCCH to acquire the configuration information of the at least two EPDCCH sets; or sending the first EPDCCH to the user equipment on the first resource, where the control information carried by the first EPDCCH includes the configuration information of the at least two EPDCCH sets, so that the user equipment acquires the configuration information of the at least two EPDCCH sets according to the control information carried by the first EPDCCH.

Optionally, the processor 1104 is further configured to invoke the program code and execute the following operation: sending a physical downlink broadcast channel or an enhanced physical downlink broadcast channel to the user equipment.

Optionally, the processor 1104 is further configured to invoke the program code and execute the following operations: sending transmission bandwidth configuration information to the user equipment; and determining, according to a transmission bandwidth of the user equipment and from the at least two EPDCCH sets configured by using the configuration information, the at least one EPDCCH set in which an EPDCCH needs to be monitored by the user equipment.

Optionally, the processor 1104 is further configured to invoke the program code and execute the following operation: sending a second EPDCCH to the user equipment on a first resource, so that the user equipment acquires the transmission bandwidth configuration information according to control information carried by the second EPDCCH; or sending a third EPDCCH on the resource corresponding to the current EPDCCH set in which an EPDCCH needs to be monitored by the user equipment, so that the user equipment acquires the transmission bandwidth configuration information according to control information carried by the third EPDCCH.

Optionally, the processor 1104 is further configured to invoke the program code and execute the following operations: performing scrambling on cyclic redundancy check CRC for the second EPDCCH by using a first RNTI, and sending the second EPDCCH to the user equipment on the first resource, where the first RNTI is shared by a group of user equipments, and transmission bandwidths corresponding to this group of user equipments are the same.

Optionally, the processor 1104 is further configured to invoke the program code and execute the following operation: determining, according to the transmission bandwidth of the user equipment and from the at least two EPDCCH sets configured by using the configuration information, that the at least one EPDCCH set in which an EPDCCH needs to be monitored by the user equipment is at least one EPDCCH set that is of the at least two EPDCCH sets and whose corresponding physical resource block is located within the transmission bandwidth of the user equipment; or determining, according to the transmission bandwidth of the user equipment and a frequency hopping pattern of the transmission bandwidth and from the at least two EPDCCH sets configured by using the configuration information, the at least one EPDCCH set in which an EPDCCH needs to be monitored by the user equipment.

Optionally, the processor 1104 is further configured to invoke the program code and execute the following operation: sending the broadcast message to the user equipment, where the broadcast message carries location indication information of the first resource.

Optionally, the first resource is a first physical resource block set in a first subframe, the first subframe is a next subframe of a subframe in which a synchronization signal and/or a discovery signal are/is carried, and a frequency domain starting location of the first physical resource block set is the same as a frequency domain starting location of a physical resource block set on which a synchronization signal and/or a discovery signal are/is carried; or the first resource is a first physical resource block set in a first subframe, the first subframe is a next subframe of a subframe in which a synchronization signal and/or a discovery signal are/is carried, and there is a predetermined offset between a frequency domain starting location of the first physical resource block set and a frequency domain starting location of a physical resource block set on which a synchronization signal and/or a discovery signal are/is carried.

Optionally, a physical resource block pair corresponding to the first resource is the same as a physical resource block pair corresponding to one EPDCCH set of the at least two EPDCCH sets.

Optionally, a transmission bandwidth corresponding to the first resource is less than or equal to a maximum transmission bandwidth supported by the user equipment, and the maximum transmission bandwidth supported by the user equipment is less than a downlink transmission bandwidth of a carrier.

Optionally, the processor 1104 is further configured to invoke the program code and execute the following operations: sending a broadcast channel, where a broadcast message carried by the broadcast channel includes first information that indicates resource allocation of the EPDCCH set, and resource block allocation information of the EPDCCH set is sent by sending the broadcast channel, where the broadcast channel is a physical broadcast channel or an enhanced physical broadcast channel.

Optionally, a quantity of information bits of the first information is corresponding to N preset physical resource block pairs, and a value of N is the same for all carriers with different downlink transmission bandwidths.

Optionally, the sending configuration information of an enhanced physical downlink control channel EPDCCH set to user equipment is sending, by the base station to the user equipment, configuration information of an enhanced physical downlink control channel EPDCCH set corresponding to enhanced physical downlink control channel EPDCCH common search space.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A control information transmission method, comprising:

receiving, by user equipment, a broadcast message through a broadcast channel;

determining, by the user equipment, a location of a first resource based on the broadcast message;

receiving, by the user equipment, first control information carried on a first physical downlink control channel on the first resource;

obtaining, by the user equipment, configuration information of at least two physical downlink control channel sets for common search spaces based on the first control information;

determining, by the user equipment according to the configuration information, at least one physical downlink control channel set of the at least two physical downlink control channel sets, wherein the at least one physical downlink control channel set needs to be monitored; and monitoring, by the user equipment, a second physical downlink control channel on a resource corresponding to the at least one physical downlink control channel set, to acquire second control information, wherein the configuration information indicates at least one of a quantity of physical resource blocks corresponding to the at least two physical downlink control channel sets for each physical downlink control channel set, and identifiers of the at least two physical downlink control channel sets for each physical downlink control channel set.

2. The method according to claim 1, wherein the obtaininq, by user equipment, configuration information of at least two physical downlink control channel sets for common search spaces comprises:

decoding, by the user equipment, a physical downlink shared channel (PDSCH) according to control information carried by the first physical downlink control channel, to acquire the configuration information of the at least two physical downlink control channel sets.

3. The method according to claim 1, wherein the determining the at least physical downlink control channel set comprises:

acquiring, by the user equipment, transmission bandwidth configuration information;

acquiring, by the user equipment, a transmission bandwidth of the user equipment based on the transmission bandwidth configuration information; and determining, by the user equipment according to the transmission bandwidth of the user equipment and the configuration information of the at least two physical downlink control channel sets, the at least one physical downlink control channel set from the at least two physical downlink control channel sets.

4. The method according to claim 3, wherein the acquiring, by the user equipment, transmission bandwidth configuration information, comprises:

receiving, by the user equipment, a first physical downlink control channel on a first resource; and acquiring the transmission bandwidth configuration information based on the control information carried by the first physical downlink control channel.

5. The method according to claim 4, wherein a physical resource block corresponding to the first resource is the same as a physical resource block corresponding to one of the at least two physical downlink control channel sets.

6. The method according to claim 3, wherein the determining the at least one physical downlink control channel set, further comprises:
   determining, by the user equipment according to the configuration information of the at least two physical downlink control channel sets, a physical resource block corresponding to the at least two physical downlink control channel sets; and
   determining, by the user equipment, that the at least one physical downlink control channel set is a set whose corresponding physical resource block is located within the transmission bandwidth of the user equipment.

7. User equipment, comprising:
   a memory; and
   a processor, coupled to the memory, the processor being configured to perform:
      receiving a broadcast message through a broadcast channel;
      determining a location of a first resource based on the broadcast message;
      receiving first control information carried on a first physical downlink control channel on the first resource;
      obtaining configuration information of at least two physical downlink control channel sets for common search spaces based on the first control information;
      determining, according to the configuration information, at least one physical downlink control channel set of the at least two physical downlink control channel sets, wherein the at least one physical downlink control channel set needs to be monitored by the user equipment; and
      monitoring a second physical downlink control channel on a resource corresponding to the at least one physical downlink control channel, to acquire second control information,
      wherein the configuration information includes at least one of a quantity of physical resource blocks corresponding to the at least two physical downlink control channel sets for each physical downlink control channel set, and identifiers of the at least two physical downlink control channel sets for each physical downlink control channel set.

8. The user equipment according to claim 7, wherein the obtaininq configuration information of at least two physical downlink control channel sets for common search spaces comprises:
   decoding a physical downlink shared channel (PDSCH) according to control information carried by the first physical downlink control channel, to acquire the configuration information of the at least two physical downlink control channel sets.

9. The user equipment according to claim 7, wherein the processor is further configured to perform:
   receiving a physical downlink broadcast channel, and acquiring the configuration information of the at least two physical downlink control channel sets according to a broadcast message carried by the physical downlink broadcast channel.

10. The user equipment according to claim 7, wherein the determining the at least physical downlink control channel set comprises:
    acquiring transmission bandwidth configuration information;
    acquiring a transmission bandwidth of the user equipment based on the transmission bandwidth configuration information; and
    determining, according to the transmission bandwidth of the user equipment and the configuration information of the at least two physical downlink control channel sets, the at least one physical downlink control channel set from the at least two physical downlink control channel sets.

11. The user equipment according to claim 10, wherein the acquiring transmission bandwidth configuration information, comprises:
    receiving, by the user equipment, a first physical downlink control channel on a first resource; and
    acquiring the transmission bandwidth configuration information based on the control information carried by the first physical downlink control channel.

12. The user equipment according to claim 11, wherein a physical resource block corresponding to the first resource is the same as a physical resource block corresponding to one of the at least two physical downlink control channel sets.

13. The user equipment according to claim 10, wherein the determining the at least one physical downlink control channel set, further comprises:
    determining, by the user equipment according to the configuration information of the at least two physical downlink control channel sets, a physical resource block corresponding to the at least two physical downlink control channel sets; and
    determining, by the user equipment, that the at least one physical downlink control channel set is a set whose corresponding physical resource block is located within the transmission bandwidth of the user equipment.

14. An apparatus in user equipment, comprising:
    a storage medium including executable instructions; and
    a processor;
    wherein the executable instructions, when executed by the processor, cause the apparatus to perform:
       receiving a broadcast message through a broadcast channel,
       determining a location of a first resource based on the broadcast message;
       receiving first control information carried on a first physical downlink control channel on the first resource;
       obtaining configuration information of at least two physical downlink control channel sets for common search spaces based on the first control information;
       determining, according to the configuration information, at least one physical downlink control channel set of the at least two physical downlink control channel sets, wherein the at least one physical downlink control channel set needs to be monitored; and
       monitoring a second physical downlink control channel on a resource corresponding to the at least one physical downlink control channel set, to acquire second control information,
       wherein the configuration information includes at least one of a quantity of physical resource blocks corresponding to the at least two physical downlink control channel sets for each physical downlink control channel set, and identifiers of the at least two physical downlink control channel sets for each physical downlink control channel set.

15. The apparatus according to claim 14, wherein the obtaining configuration information of at least two physical downlink control channel sets for common search spaces comprises:
   decoding a physical downlink shared channel (PDSCH) according to control information carried by the first physical downlink control channel, to acquire the configuration information of the at least two physical downlink control channel sets.

16. The apparatus according to claim 14, wherein the determining the at least physical downlink control channel set comprises:
   acquiring, by the user equipment, transmission bandwidth configuration information;
   acquiring, by the user equipment, a transmission bandwidth of the user equipment based on the transmission bandwidth configuration information; and
   determining, by the user equipment according to the transmission bandwidth of the user equipment and the configuration information of the at least two physical downlink control channel sets, the at least one physical downlink control channel set from the at least two physical downlink control channel sets.

17. The apparatus according to claim 16, wherein the acquiring, by the user equipment, transmission bandwidth configuration information, comprises:
   receiving, by the user equipment, a first physical downlink control channel on a first resource; and
   acquiring the transmission bandwidth configuration information based on the control information carried by the first physical downlink control channel.

18. The apparatus according to claim 17, wherein a physical resource block corresponding to the first resource is the same as a physical resource block corresponding to one of the at least two physical downlink control channel sets.

19. The apparatus according to claim 16, wherein the determining the at least one physical downlink control channel set, further comprises:
   determining, by the user equipment according to the configuration information of the at least two physical downlink control channel sets, a physical resource block corresponding to the at least two physical downlink control channel sets; and
   determining, by the user equipment, that the at least one physical downlink control channel set is a set whose corresponding physical resource block is located within the transmission bandwidth of the user equipment.

20. A non-transitory computer-readable storage medium storing instructions that, when executed by a processor, cause the processor to carry out the following:
   receiving a broadcast message through a broadcast channel;
   determining a location of a first resource based on the broadcast message;
   receiving first control information carried on a first physical downlink control channel on the first resource;
   obtaining configuration information of at least two physical downlink control channel sets for common search spaces based on the first control information;
   determining, according to the configuration information, at least one physical downlink control channel set of the at least two physical downlink control channel sets, wherein the at least one physical downlink control channel set needs to be monitored; and
   monitoring a second physical downlink control channel on a resource corresponding to the at least one physical downlink control channel set, to acquire second control information,
   wherein the configuration information includes at least one of a quantity of physical resource blocks corresponding to the at least two physical downlink control channel sets for each physical downlink control channel set, and an identifier of the at least two physical downlink control channel sets for each physical downlink control channel set.

21. The non-transitory computer-readable storage medium according to claim 20, wherein the obtaining configuration information of at least two physical downlink control channel sets for common search spaces comprises:
   decoding a physical downlink shared channel (PDSCH) according to control information carried by the first physical downlink control channel, to acquire the configuration information of the at least two physical downlink control channel sets.

22. The non-transitory computer-readable storage medium according to claim 20, wherein the determining the at least physical downlink control channel set comprises:
   acquiring, by the user equipment, transmission bandwidth configuration information;
   acquiring, by the user equipment, a transmission bandwidth of the user equipment based on the transmission bandwidth configuration information; and
   determining, by the user equipment according to the transmission bandwidth of the user equipment and the configuration information of the at least two physical downlink control channel sets, the at least one physical downlink control channel set from the at least two physical downlink control channel sets.

23. The non-transitory computer-readable storage medium according to claim 22, wherein the acquiring, by the user equipment, transmission bandwidth configuration information, comprises:
   receiving, by the user equipment, a first physical downlink control channel on a first resource; and
   acquiring the transmission bandwidth configuration information based on the control information carried by the first physical downlink control channel.

24. The non-transitory computer-readable storage medium according to claim 23, wherein a physical resource block corresponding to the first resource is the same as a physical resource block corresponding to one of the at least two physical downlink control channel sets.

25. The non-transitory computer-readable storage medium according to claim 22, wherein the determining the at least one physical downlink control channel set, further comprises:
   determining, by the user equipment according to the configuration information of the at least two physical downlink control channel sets, a physical resource block corresponding to the at least two physical downlink control channel sets; and
   determining, by the user equipment, that the at least one physical downlink control channel set is a set whose corresponding physical resource block is located within the transmission bandwidth of the user equipment.

* * * * *